(12) United States Patent
Totani et al.

(10) Patent No.: US 8,091,286 B2
(45) Date of Patent: Jan. 10, 2012

(54) VEHICLE DOOR

(75) Inventors: Chiharu Totani, Aichi-ken (JP);
Katsuhiro Katagiri, Aichi-ken (JP);
Toshiro Shibagaki, Aichi-ken (JP);
Masayuki Kitashiba, Aichi-ken (JP);
Chie Ito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 419 days.

(21) Appl. No.: 12/318,258

(22) Filed: Dec. 23, 2008

(65) Prior Publication Data
US 2009/0165392 A1 Jul. 2, 2009

(30) Foreign Application Priority Data

Dec. 27, 2007 (JP) ................... 2007-336043
Mar. 31, 2008 (JP) ................... 2008-089902
Oct. 31, 2008 (JP) ................... 2008-280894

(51) Int. Cl.
*B60J 5/04* (2006.01)
(52) U.S. Cl. ............. 49/502; 296/146.5; 296/146.6
(58) Field of Classification Search ............. 49/502, 49/501; 296/146.2, 146.5, 146.6, 146.7
See application file for complete search history.

(56) References Cited

U.S. PATENT DOCUMENTS

| | | | | |
|---|---|---|---|---|
| 2,765,056 A * | 10/1956 | Tyree | ............. | 49/399 |
| 4,476,988 A * | 10/1984 | Tanner | ............. | 220/1.5 |
| 4,803,108 A * | 2/1989 | Leuchten et al. | ............. | 428/118 |
| 4,850,636 A * | 7/1989 | McLaren et al. | ............. | 296/146.5 |
| 5,306,066 A * | 4/1994 | Saathoff | ............. | 296/146.6 |
| 5,435,619 A * | 7/1995 | Nakae et al. | ............. | 296/187.12 |
| 5,467,558 A * | 11/1995 | Kober et al. | ............. | 49/220 |
| 5,660,428 A * | 8/1997 | Catlin | ............. | 296/205 |
| 5,857,702 A * | 1/1999 | Suga et al. | ............. | 280/751 |
| 5,997,077 A * | 12/1999 | Siebels et al. | ............. | 296/187.12 |
| 6,117,520 A * | 9/2000 | Wielinga et al. | ............. | 428/116 |
| 6,126,231 A * | 10/2000 | Suzuki et al. | ............. | 296/187.05 |
| 6,164,716 A * | 12/2000 | Palazzolo et al. | ............. | 296/187.12 |
| 6,196,617 B1 * | 3/2001 | Beck | ............. | 296/146.11 |
| 6,199,942 B1 * | 3/2001 | Carroll et al. | ............. | 296/187.05 |
| 6,302,472 B1 * | 10/2001 | Rahmstorf et al. | ............. | 296/146.5 |
| 6,375,249 B1 * | 4/2002 | Stanton et al. | ............. | 296/178 |

(Continued)

FOREIGN PATENT DOCUMENTS

JP A-2004-255906 9/2004

*Primary Examiner* — Katherine Mitchell
*Assistant Examiner* — Justin Rephann
(74) *Attorney, Agent, or Firm* — Posz Law Group, PLC

(57) ABSTRACT

A front door 20 includes a first door component 22 and a second door component 34. The first door component 22 forms an inner side portion of a door main body 21, and the second door component forms an inner side portion of the door main body 21 and has functional parts located inside the vehicle. The first and second door components 22, 34 have honeycomb structural bodies 23, 41, respectively. The honeycomb structural bodies 23, 41 are entirely formed of synthetic resin. The honeycomb structural bodies 23, 41 include honeycomb portions 24, 42, which are composed of numerous tubular cells 26, 44, 45 separated by partition walls 25, 43, and sealing plate portions 27, 28, 46, 47 that are located on the outer side and the inner side of the honeycomb portions 24, 42 and seal the cells 26, 44. The door components 22, 34 are joined to each other at least at a part of the adjacent sealing plate portions 28, 46 of the honeycomb structural bodies 23, 41.

21 Claims, 18 Drawing Sheets

U.S. PATENT DOCUMENTS

| | | |
|---|---|---|
| 6,612,641 B2 * | 9/2003 | Schutt et al. ................ 296/152 |
| 2001/0017476 A1 * | 8/2001 | Nishikawa et al. ........ 296/146.6 |
| 2005/0248180 A1 * | 11/2005 | Campo Barasoain et al. ................ 296/146.6 |
| 2006/0141260 A1 * | 6/2006 | Haque et al. ................ 428/412 |
| 2006/0261635 A1 * | 11/2006 | Winborn et al. ............. 296/154 |
| 2007/0101679 A1 * | 5/2007 | Harthcock et al. ........... 52/782.1 |

* cited by examiner

Outside ←          → Inside

Front ← → Rear

Front ← → Rear

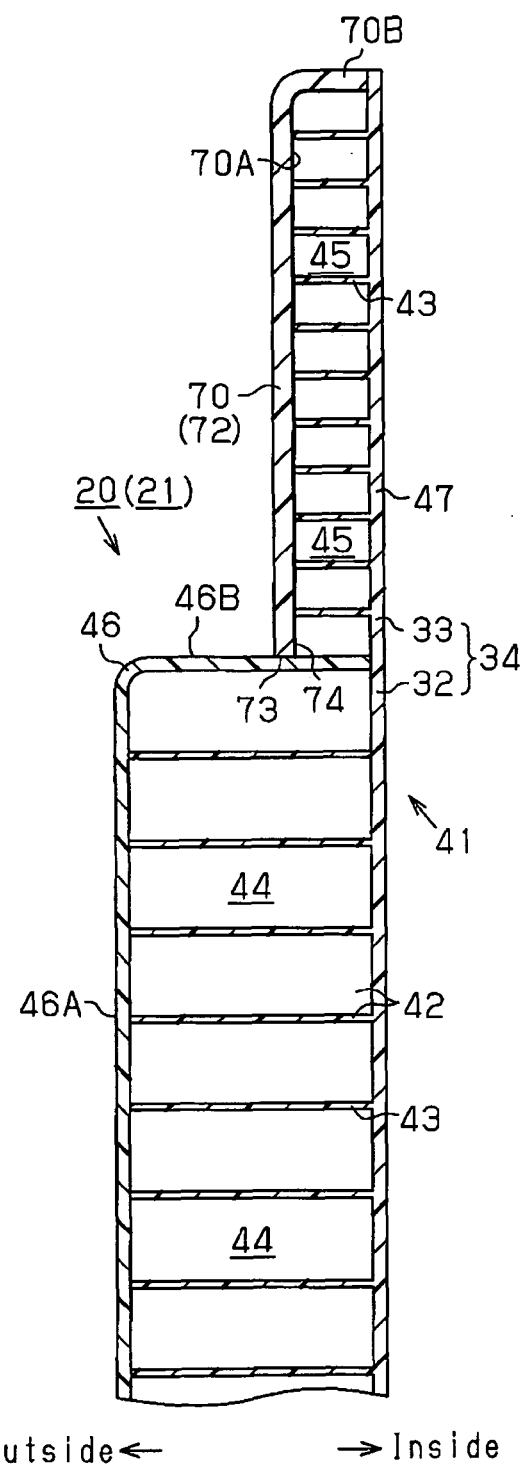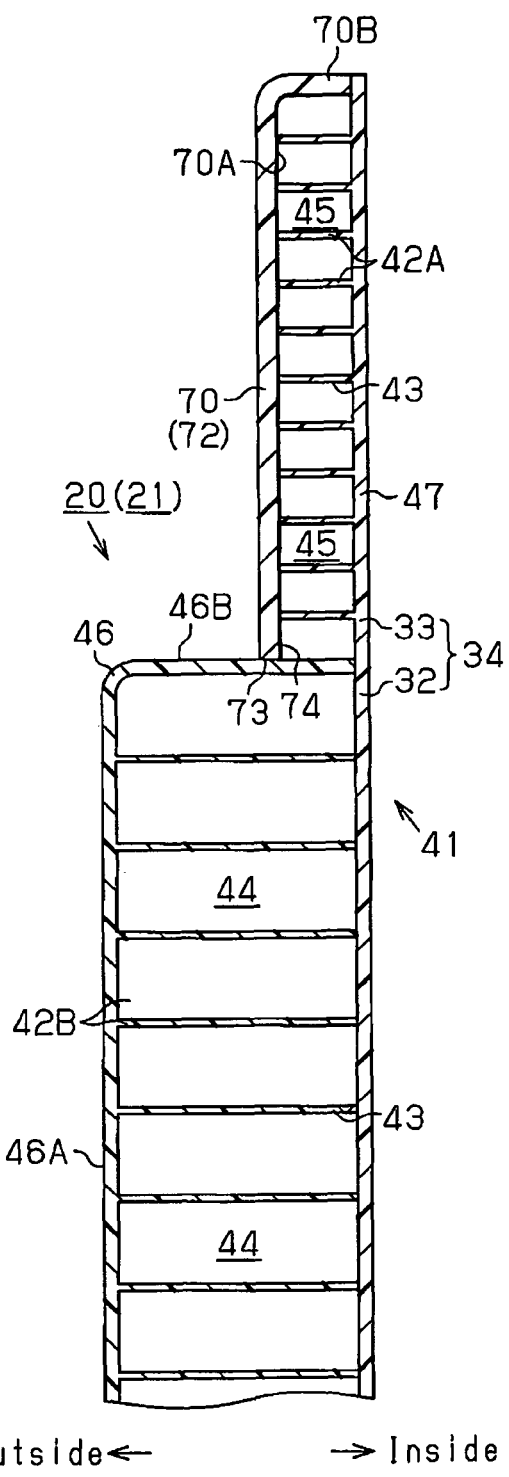

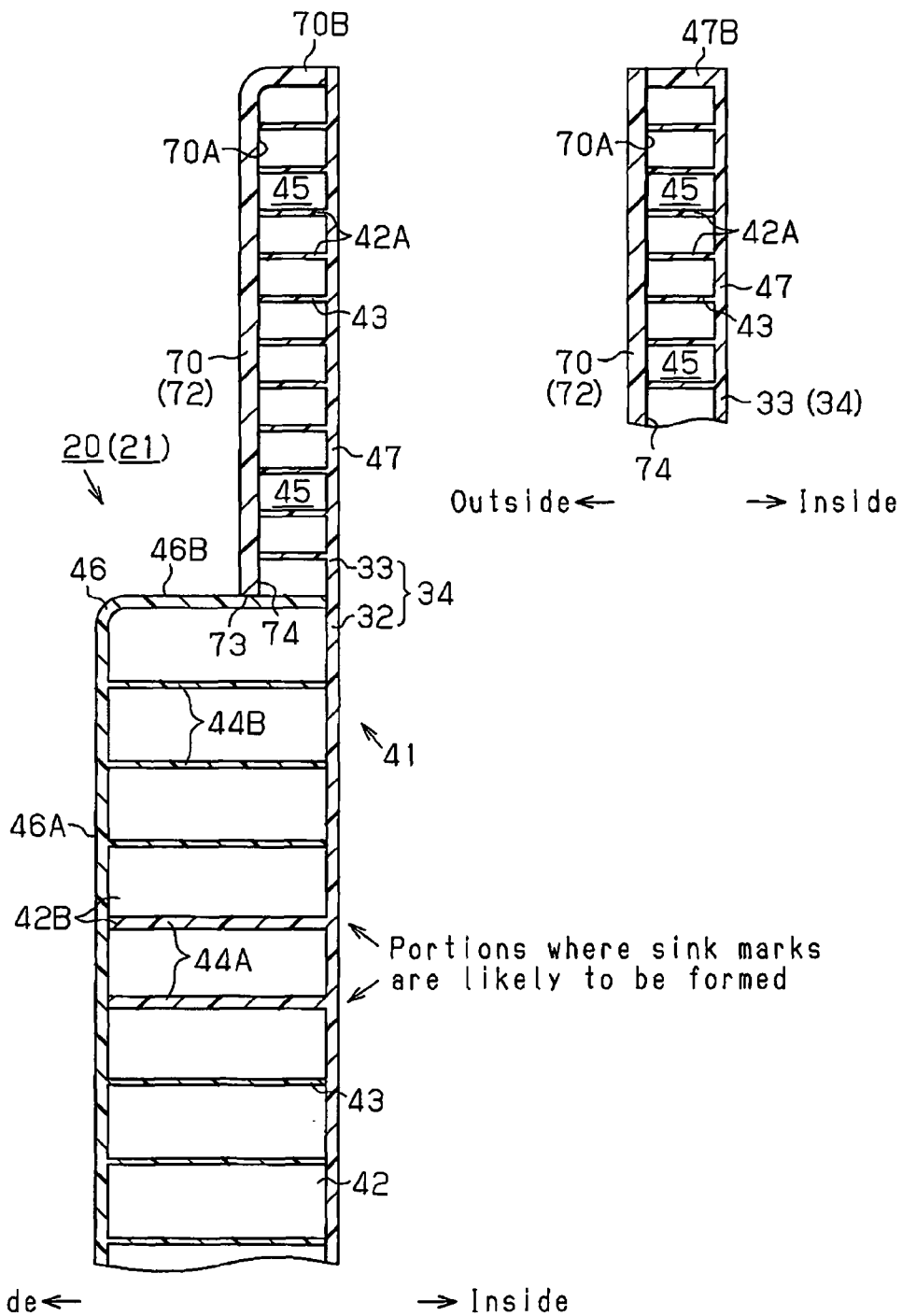

VEHICLE DOOR

BACKGROUND OF THE INVENTION

The present invention relates to a vehicle door such as a front door, rear door, and a tail door.

To improve the fuel economy of a vehicle, reduction in weigh of the vehicle is an effective measure. This is because weight reduction of a vehicle reduces the energy required for driving the vehicle. Methods for reducing the weight of a vehicle include reduction in weight of materials, reduction in size and weight of individual parts, and reduction in the number of parts by improvement of function.

For example, Japanese Laid-Open Patent Publication No. 2004-255906 discloses a technology for reducing the weight of a vehicle component, or a vehicle door having a door main body and window glass. The vehicle door has an iron pipe between the inner panel and the outer panel of the door main body. Shock absorbing material is provided in occupant protection areas above and below the iron pipe. The shock absorbing material is formed of a honeycomb structural body and a pair of planer members attached to both sides of the honeycomb structural body. The weight of the vehicle door is reduced by the use of the honeycomb structural body as a part of the shock absorbing material. When an impact is applied to the vehicle door, the shock absorbing material is deformed to absorb the impact.

In addition to demands for reduction in weight, there are demands for higher strength of vehicle doors. However, the vehicle door disclosed in the above publication is formed simply by constructing a part of the door main body with shock absorbing material. Therefore, the weight of the entire vehicle door including the window glass is not sufficiently reduced. Further, in the vehicle door of the publication, the honeycomb structural body is used primarily for improving the shock absorbing performance, and the improvement of the strength is not fully considered.

SUMMARY OF THE INVENTION

An objective of the present invention is to provide a light vehicle door having high strength.

To achieve the foregoing objective and in accordance with a first aspect of the present invention, a vehicle door that selectively opens and closes an opening formed in the body of a vehicle is provided. The vehicle door includes a door main body, a synthetic resin first door component, and a synthetic resin second door component. The door main body forms a main part of the vehicle door. The synthetic resin first door component is entirely constructed by a honeycomb structural body. The first door component forms an outer side portion of the door main body. The synthetic resin second door component is entirely constructed by a honeycomb structural body and is arranged adjacent to the first door component. The second door component forms an inner side portion of the door main body. A functional part on the inner side is fastened to the second door component. Each honeycomb structural body includes a honeycomb portion, which is composed of numerous tubular cells separated by partition walls, and a pair of the sealing plate portions located on the outer side and the inner side of the honeycomb portion. The sealing plate portions seal the cells. The first door component and the second door component are joined to each other at least at a part of the adjacent sealing plate portions of the honeycomb structural bodies.

In accordance with a second aspect of the present invention, a vehicle door including a door main body forming a main part of the vehicle door and a window glass attached to the door main body is provided. At least a part of the door main body is constructed by a synthetic resin honeycomb structural body. The honeycomb structural body includes a honeycomb portion composed of numerous tubular cells separated by partition walls, and a pair of the sealing plate portions that sandwich the honeycomb portion from both sides, thereby sealing the cells. A part of one of the sealing plate portions, which seal the honeycomb structural body, is formed by a part of the window glass.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 17(A) and 17(B) are cross-sectional views each illustrating a front door according to a modification of the second embodiment, in which the door main body is formed by a single honeycomb structural body;

FIG. 18(A) is a cross-sectional view illustrating a front door according to a modification of the second embodiment, in which the door main body is formed by a single honeycomb structural body;

FIG. 18(B) is an enlarged partial cross-sectional view illustrating an upper end portion of a front door according to a modification of the second embodiment.

DETAILED DESCRIPTION OF THE PREFERRED EMBODIMENTS

First Embodiment

A vehicle front door according to a first embodiment of the present invention will now be described with reference to FIGS. 1 to 9.

Figure 5:
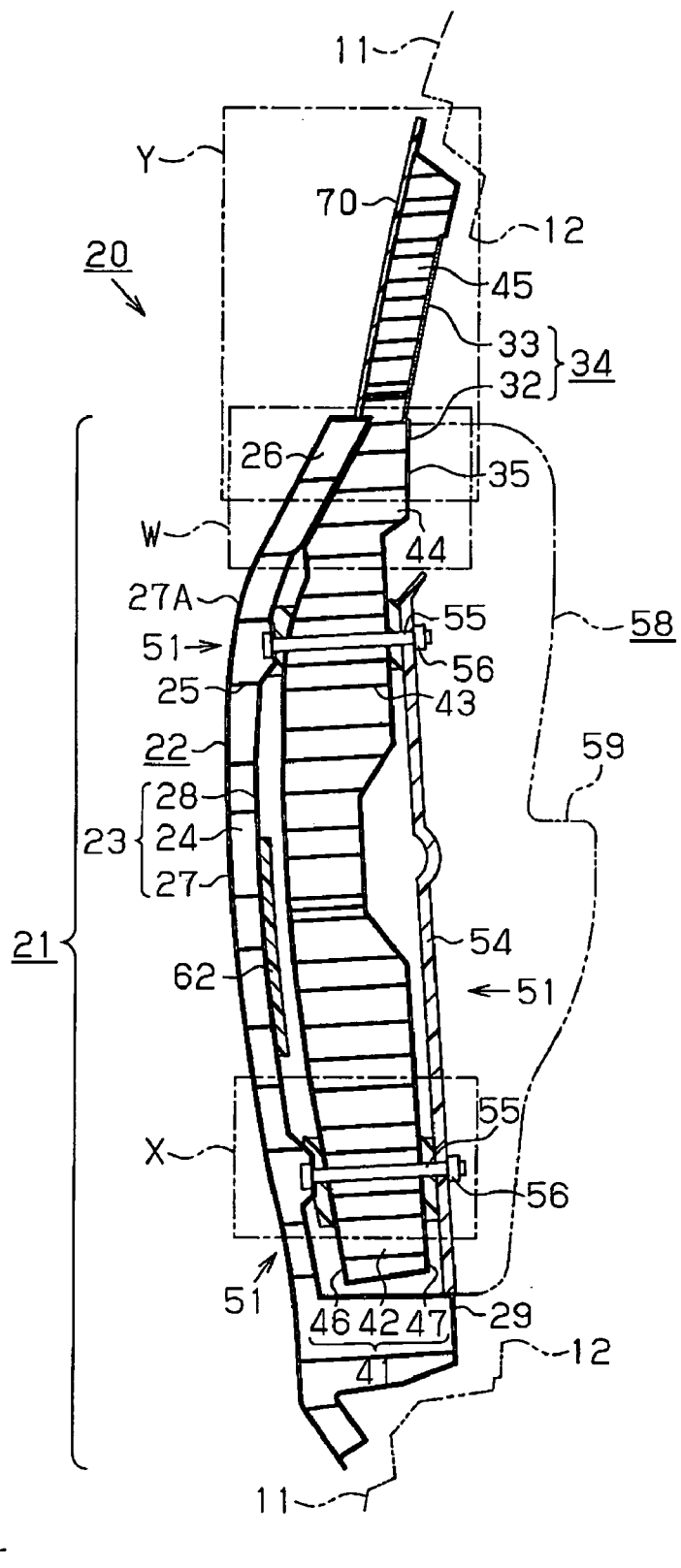
FIG. 5 is a cross-sectional view taken along line 5-5 of FIG. 1.
Figure 6:
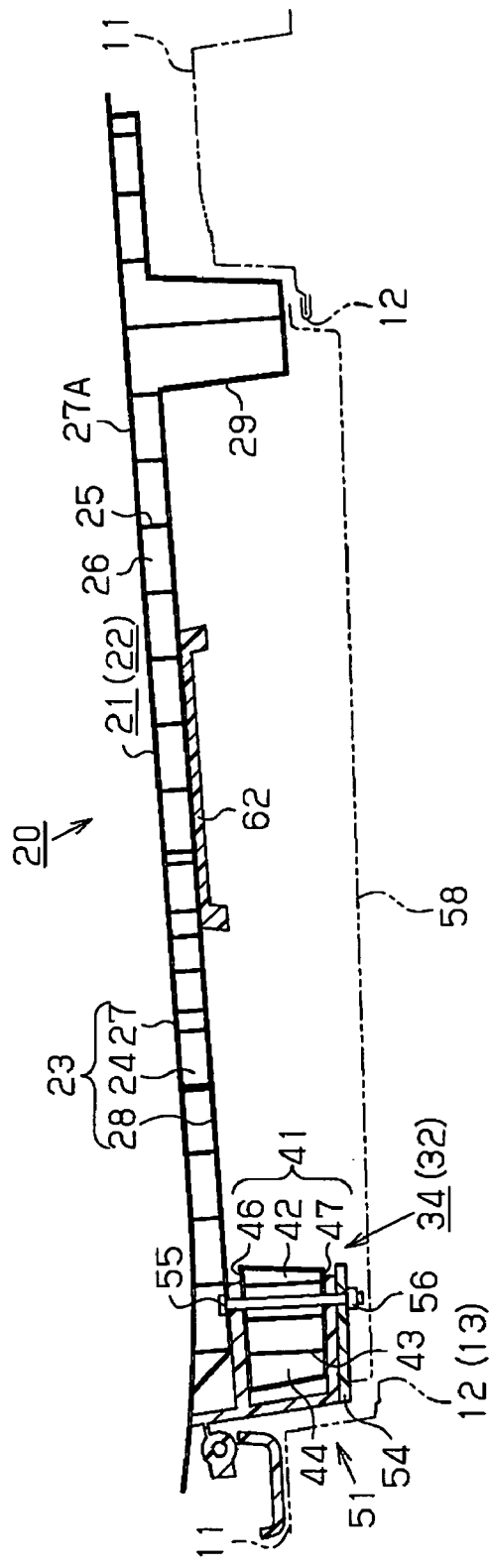
FIG. 6 is a cross-sectional view taken along line 6-6 of FIG. 1.

As shown by alternate long and two short dashes lines in FIGS. 5 and 6, an opening 12 for allowing an occupant to enter and exit the vehicle is formed beside each of the front seats (the driver's seat and the front passenger seat) in the body 11 of a vehicle. A front door 20 according to the first embodiment is attached to the vehicle to selectively open and close the opening 12. Specifically, the front door 20 is selectively brought closer to and moved away from the opening 12, so as to selectively close and open the opening 12.

The front door 20 includes a door main body 21 forming a main part of the front door 20 and a window glass 70 attached to the door main body 21. The window glass 70 is made of a transparent synthetic resin such as a polycarbonate resin, and is lighter than ones made of inorganic materials. Unlike a common front door, the front door 20 is a type in which the window glass 70 is fixed to the door main body 21 and is not lifted or lowered. The front door 20 is supported in the vicinity of a front edge 13 (FIG. 6) of the opening 12 of the vehicle body 11 by door hinges 51, so as to be selectively opened and closed.

Figure 3:
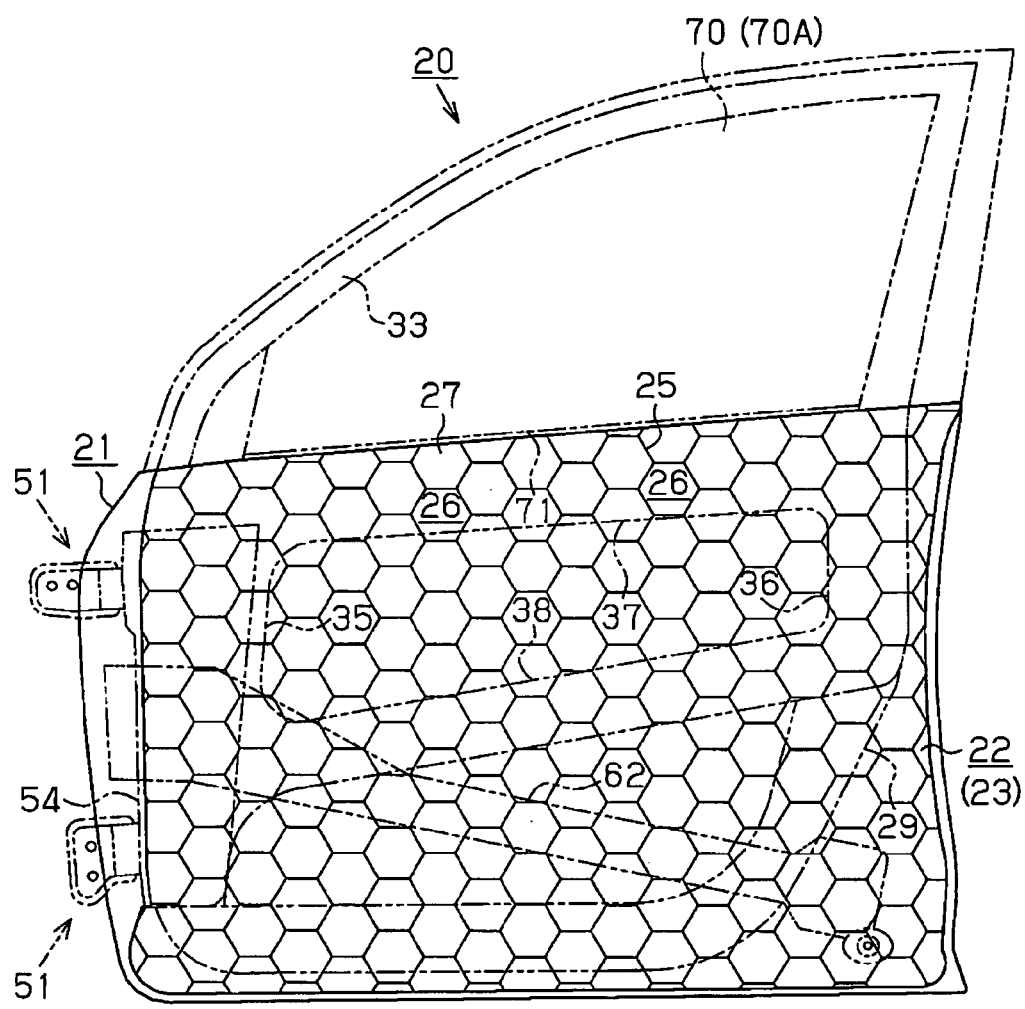
FIG. 3 is a side view illustrating the interior of a first door component of the front door shown in FIG. 1.
Figure 4:
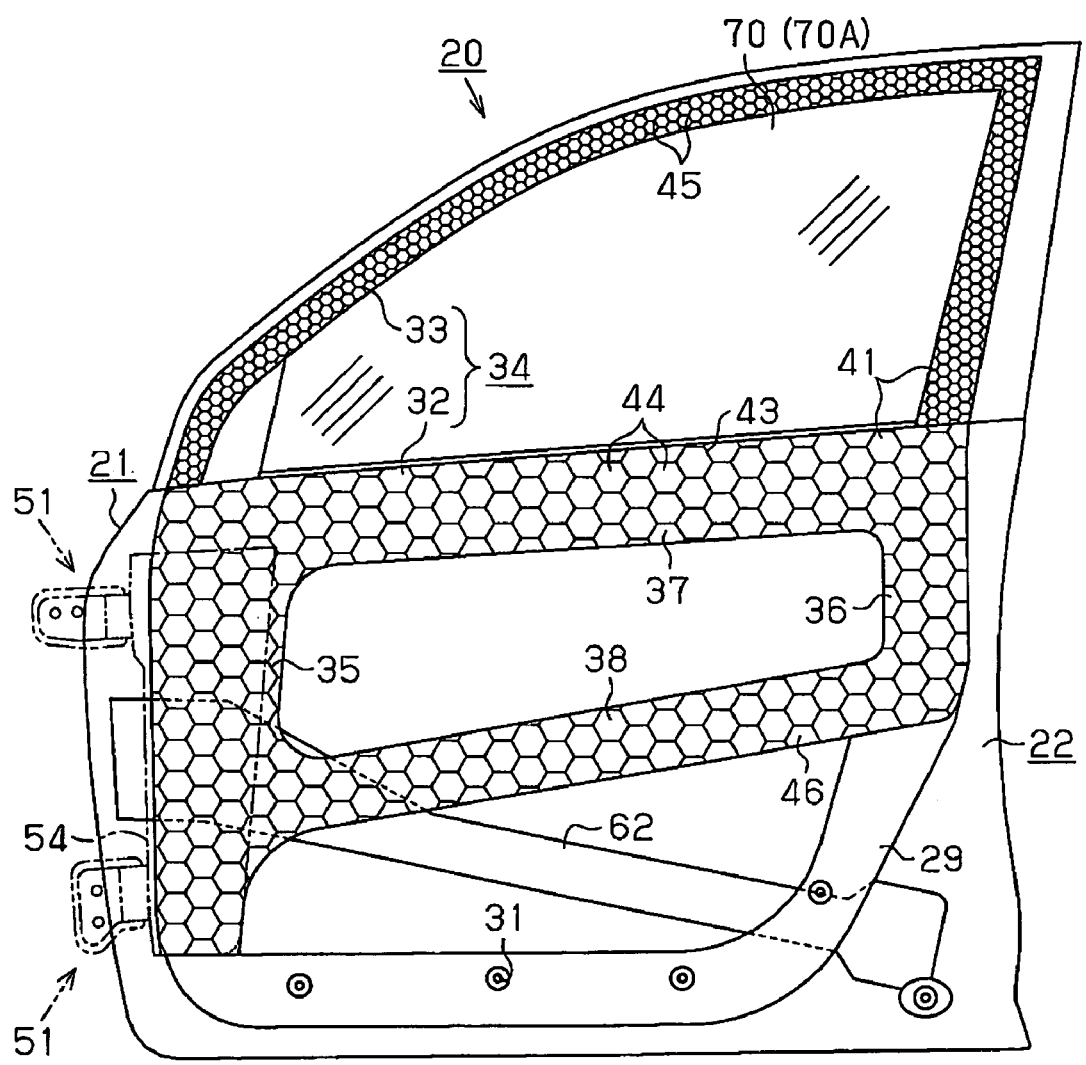
FIG. 4 is a side view illustrating the interior of a second door component of the front door shown in FIG. 1.

The door main body 21 includes a first door component 22 forming an outer side portion and a second door component 34 forming an inner side portion. The first door component 22 is made of fiber-reinforced resin. When viewed from the side, the first door component 22 has a substantially rectangular outer shape (FIG. 3). The fiber-reinforced resin is a composite material having a base material of a synthetic resin such as PP (polypropylene), PA (polyamide), or PET (polyethylene terephthalate), and reinforcement that is contained in the base material and is composed of carbon fibers or glass fibers having relatively short fiber lengths. The fiber lengths of the reinforcement are determined to such values that do not hinder the injection molding of the first door component 22, and are preferably in the range from 50 μm to 2000 μm.

Figure 7:
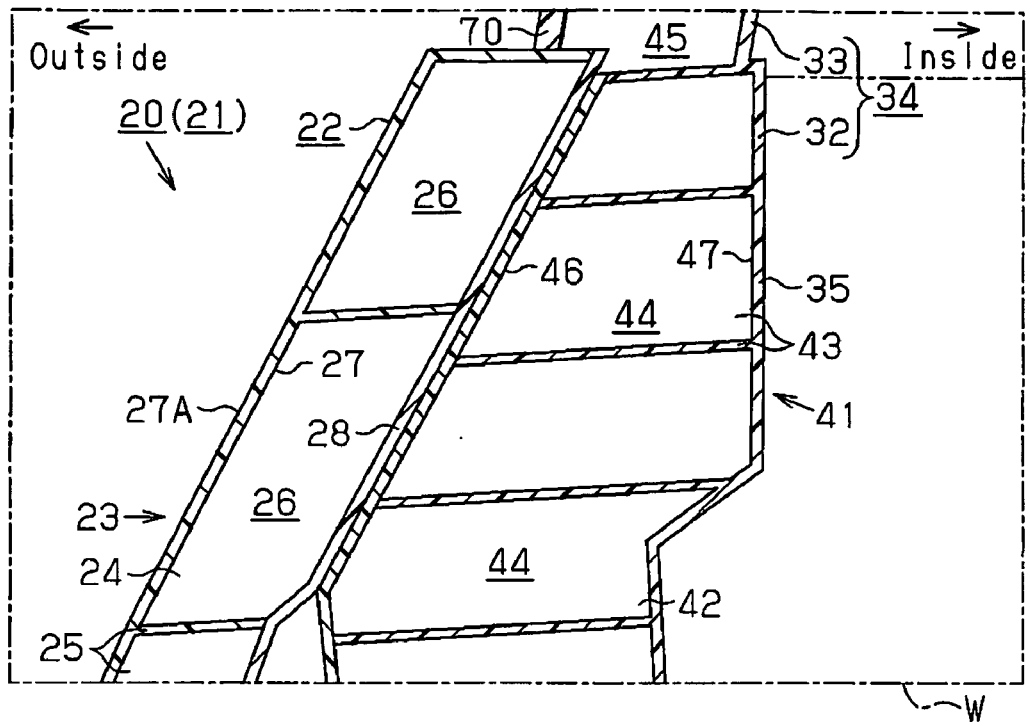
FIG. 7 is an enlarged partial cross-sectional view illustrating section W in FIG. 5.
Figure 9A:
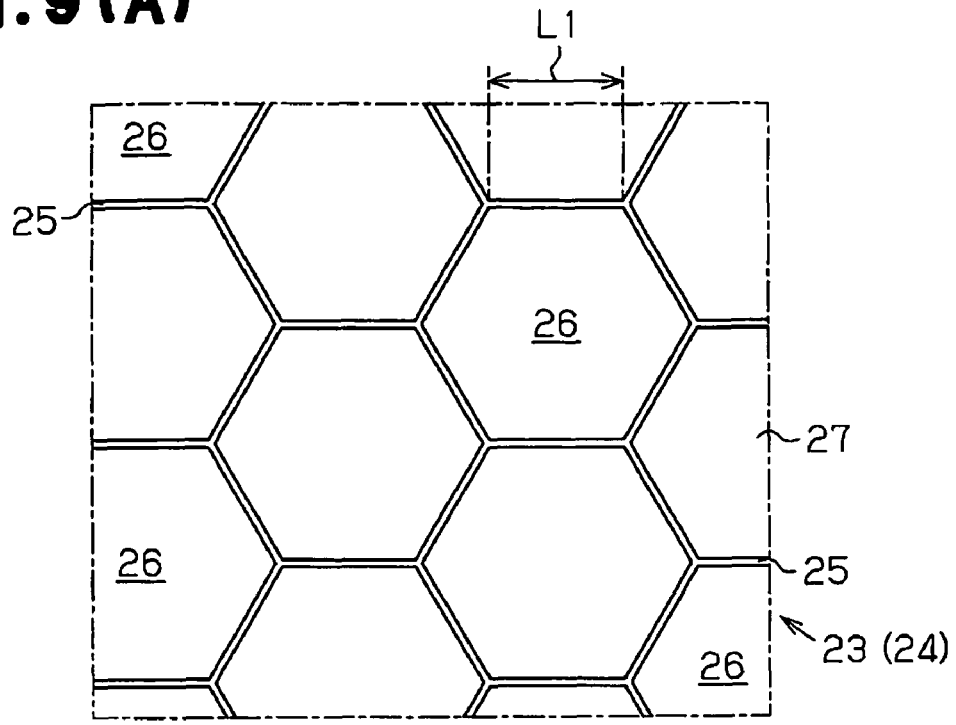
FIG. 9(A) is an enlarged partial view illustrating cells in the honeycomb structural body of the first door component shown in FIG. 3.

The first door component 22 is entirely constructed by a honeycomb structural body 23. As shown in FIGS. 3, 7, and 9(A), the honeycomb structural body 23 is formed by a honeycomb portion 24 and a pair of sealing plate portions 27, 28. The honeycomb portion 24 is formed by numerous cells 26, which are hexagonal tubes divided by partition walls 25. The cells 26 extend in the lateral direction (widthwise direction) of the vehicle. Each group of adjacent cells 26 are joined to each other. The length L of the sides of the open end of the cells 26 is approximately 50 mm. The sealing plate portions 27, 28 are located on both sides (the outer side and the inner side) of the honeycomb portion 24, so as to seal the cells 26. In the first embodiment, the honeycomb portion 24 is integrally formed with the outer side sealing plate portion 27 through injection molding (refer to FIG. 7). The outer surface 27A of the sealing plate portion 27 forms an ornamental surface of the door main body 21. The inner sealing plate portion 28 is molded separately from the honeycomb portion 24. After being molded, the sealing plate portion 28 is joined to the honeycomb portion 24 by welding or adhesion.

Figure 1:
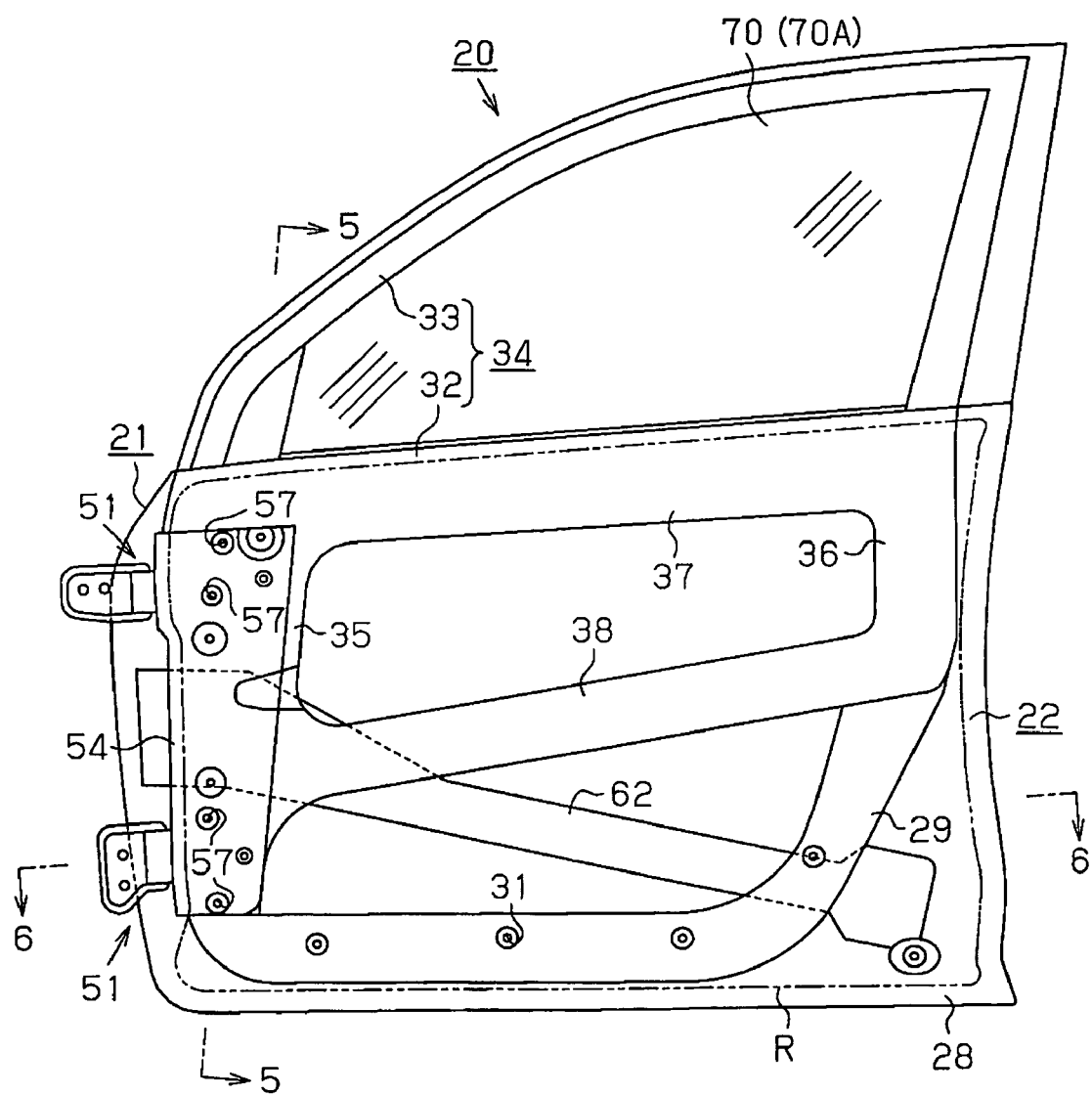
FIG. 1 is a side view as viewed from the inside of a vehicle, illustrating a front door according to a first embodiment of the present invention with the door trim removed.
Figure 2:
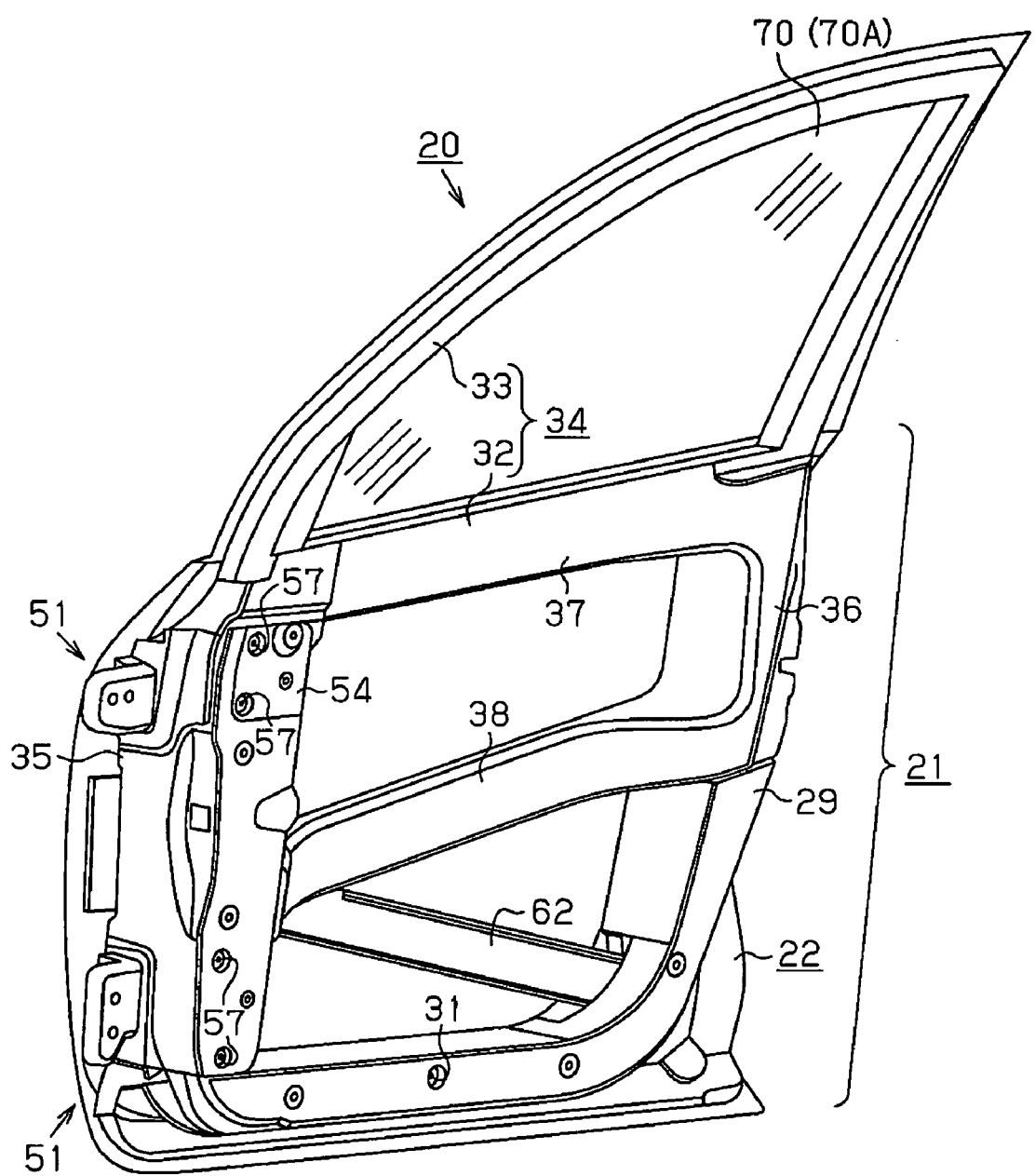
FIG. 2 is a perspective view illustrating the front door shown in FIG. 1.

As shown in FIGS. 1 and 2, a tubular frame portion 29 is provided to extend from the lower end portion to the rear end portion of the first door component 22. The tubular frame portion 29 may be constructed by the honeycomb structural body 23 described above, or any suitable material. The tubular frame portion 29 has a plurality of engagement holes 31, with which clips (not shown) for installing a door trim (described below) are engaged.

The second door component 34 is formed of the same fiber-reinforced resin as that of the first door component 22. The second door component 34 is located on the inner side of the first door component 22. The second door component 34 has a base portion 32 and a window frame portion 33 located above the base portion 32. The base portion 32 is located in an area R having the same shape as the first door component 22 (the area R corresponds an area projected by light irradiated onto the first door component in FIG. 1 from the outside: refer to alternate long and two short dashes lines). The window frame portion 33 encompasses the periphery of the window glass 70 except for the lower edge.

In addition to the feature of increasing the strength of the door main body 21 together with the first door component 22, the base portion 32 in the second door component 34 functions as a part to which functional parts located on the inner side of the first door component 22 are fastened. The base portion 32 has a substantially rectangular shape and occupies a part of the area R.

More specifically, the base portion 32 includes a vertical frame portion 35 at a position corresponding to the front edge of the area R, and a vertical frame portion 36 at a position corresponding to the rear edge. The vertical frame portions 35, 36 function as frame portions and extend substantially vertically. The upper end portion of each vertical frame portion 35, 36 is located at the upper end of the area R. The lower end portion of the front vertical frame portion 35 is located in a lower portion of the area R, and the lower end portion of the rear frame portion 36 is at a middle point in the area R with respect to the vertical direction. The base portion 32 also has a pair of upper and lower elongated lateral frame portions 37, 38 extending between the front vertical frame portion 35 and the rear vertical frame portion 36. The lateral frame portions 37, 38 function as bridge portions. The upper lateral frame portion 37 extends between the upper ends of the vertical frame portions 35, 36, and is located along the upper edge of the area R. The lower lateral frame portion 38 extends substantially in the front and rear direction of the vehicle, while passing through a center portion of the area R and being inclined downward toward the front end. The lateral frame portion 38 extends between a lower portion of the front vertical frame portion 35 and the lower end portion of the rear vertical frame portion 36, and is located in a middle point of the area R in the vertical direction.

As described above, the base portion 32 is formed by a pair of the vertical frame portions 35, 36 located at front and rear opposite positions in the outer periphery of the area R, and the lateral frame portions 37, 38, which extend between the vertical frame portions 35, 36 in the area R. The widths of the vertical frame portion 35, 36 and the lateral frame portions 37, 38 are wider than the width of the window frame portion 33 when viewed from the side of the vehicle. In the area R, the area surrounded by the vertical frame portion 35, 36 and the lateral frame portions 37, 38 define an opening.

As shown in FIGS. 4 to 7, the second door component 34 (the base portion 32 and the window frame portion 33) is entirely constructed by a honeycomb structural body 41. The base portion 32 and the window frame portion 33 of the honeycomb structural body 41 basically have the same structure. The honeycomb structural body 41 has the same structure as the honeycomb structural body 23 in the first door component 22. That is, the honeycomb structural body 41 is formed by a honeycomb portion 42 and a pair of sealing plate portions 46, 47. The honeycomb portion 42 is formed by numerous cells 44, 45, which are hexagonal tubes divided by partition walls 43. The cells 44 are located in the base portion 32, and the cells 45 are located in the window frame portion 33. The cells 44, 45 extend in the lateral direction (widthwise direction) of the vehicle.

Figure 9B:
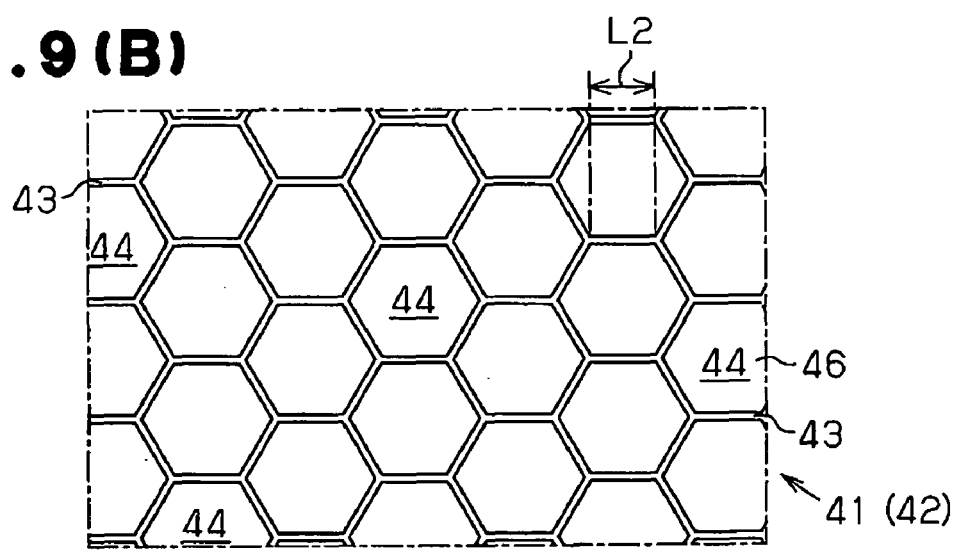
FIG. 9(B) is an enlarged partial view illustrating cells in the honeycomb structural body in a base portion of the first door component shown in FIG. 4.

The cells 44 in the base portion 32 have a size different from that of the cells 45 in the window frame portion 33. As shown in FIG. 9(B), the length L2 of the sides of the cells 44 in the base portion 32 is shorter than the length L1 of the sides of the cells 26 in the first door component 22, and is set to be approximately 25 mm. This design is intended to ensure the strength of the base portion 32 (the vertical frame portions 35, 36 and the lateral frame portions 37, 38), which has a relatively narrow width, by reducing the length of each side to reduce the size of the cells 44.

Figure 9C:
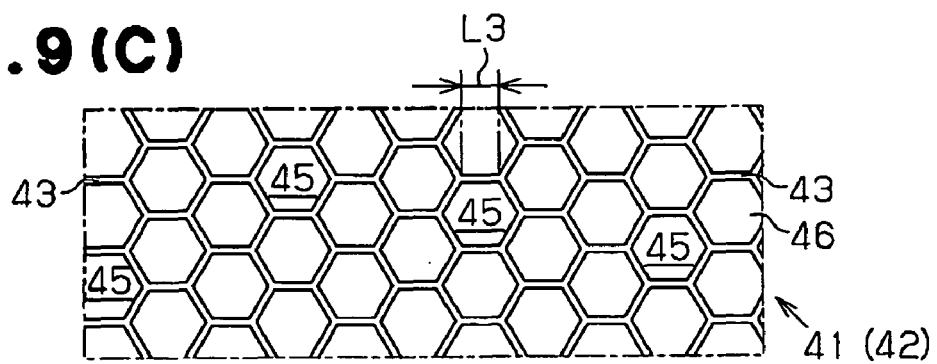
FIG. 9(C) is an enlarged partial view illustrating cells in the honeycomb structural body in a window frame portion of the first door component shown in FIG. 4.

As shown in FIG. 9(C), the length L3 of the sides of the cells 45 in the window frame portion 33 is even shorter than the length L2 of the sides of the cells 44 in the base portion 32, and is set to be approximately 15 mm. This is design is intended to ensure the strength of the window frame portion 33, which has a relatively narrow width, by reducing the length of each side to reduce the size of the cells 45.

Figure 8:
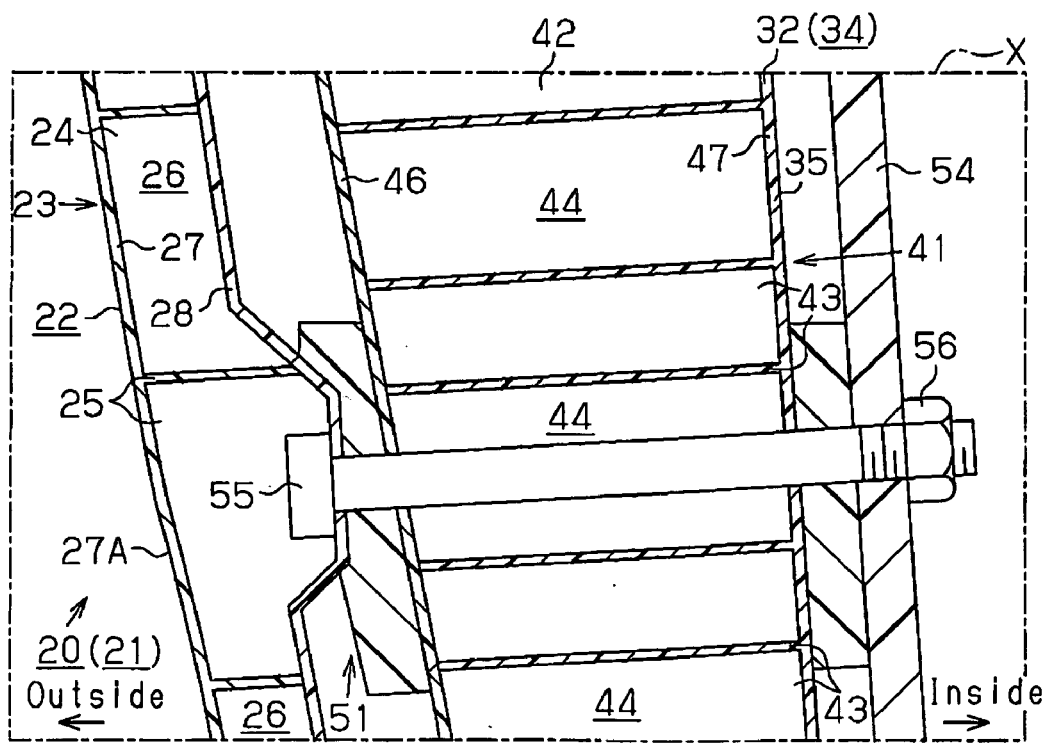
FIG. 8 is an enlarged partial cross-sectional view illustrating section X in FIG. 5.

As shown in FIGS. 7 and 8, the sealing plate portions 46, 47 are located on both sides (the outer side and the inner side) of the honeycomb portion 42 to seal each of the cells 44 (45). The honeycomb portion 42 and one of the sealing plate portions 46, 47, or the inner side sealing plate portion 47 are integrally molded by injection molding. The other sealing plate portion 46 (on the outer side) is formed separately from the honeycomb portion 42. The outer side sealing plate portion 46 is joined to the honeycomb portion 42 by welding or adhesion.

The first door component 22 and the second door component 34 are joined to each other by adhesion or welding at parts of the adjacent sealing plate portions 28, 46 of the honeycomb structural bodies 23, 41, more specifically, at opposite portions (refer to FIG. 7).

The above described door hinges 51 are functional parts located on the inner side of the first door component 22 as shown in FIGS. 1 and 2. A pair of the door hinges 51 located at upper and lower portions of the front vertical frame portion 35 in the above described second door component 34. A coupler portion 54 is located on the base portion 32 on the inner side of the upper and lower door hinges 51. As shown in FIGS. 5, 6, and 8, each door hinge 51 is fastened to the vertical frame portion 35 by a bolt 55 and a nut 56 together with the coupler portion 54. Each door hinge 51 is supported in the vicinity of the front edge 13 of the opening 12 of the body 11 to be selectively opened and closed, that is, to be rotatable. The coupler portion 54 has engagement holes 57 similar to the engagement holes 31 of the tubular frame portion 29 of the first door component 22 (refer to FIG. 1).

As shown by alternate long and two short dashes lines in FIGS. 5 and 6, a door trim 58 made of synthetic resin is located on the inner side of the base portion 32. The door trim 58 is also a functional part located on the inner side of the first door component 22. The surface of the door trim 58 facing the passenger compartment forms an ornamental surface. An armrest 59 is integrally molded with the door trim 58. The door trim 58 has a plurality of clips (not shown), which are engaged with the engagement holes 31, 57, so that the door trim 58 is attached to the tubular frame portion 29 and is fastened to the second door component 34 together with the coupler portion 54.

Further, as shown in FIGS. 1 and 2, an impact beam 62 made of fiber-reinforced resin is arranged in the vicinity of and on the inner side of the first door component 22. The fiber-reinforced resin of the impact beam 62 is a reinforced synthetic resin containing fibers such as carbon fibers or glass fibers having longer fiber lengths than the fiber-reinforced resin in the first door component 22 and the second door component 34. The impact beam 62 is formed by a plate that extends substantially in the front and rear direction. The front end of the impact beam 62 is located at a vertical middle point in the front end portion of the first door component 22, and the rear end of the impact beam 62 is located at a rear lower portion of the first door component 22. The impact beam 62 is formed by a molding method different from those of the first door component 22 and the second door component 34, for example, by compression molding or extrusion. The impact beam 62 is fixed to the inner surface of the first door component 22 by welding or adhesion.

The above described front door 20 is light weighted because of the following reasons.

(i) The first door component 22, which forms the outer side portion of the door main body 21, is entirely formed of synthetic resin.

(ii) The second door component 34, which forms the inner side portion of the door main body 21, is entirely formed of synthetic resin.

(iii) The first door component 22 and the second door component 34 are each entirely constructed by the honeycomb structural body 23, 41 (refer to FIG. 5). The honeycomb structural bodies 23, 41 are constructed by the honeycomb portions 24, 42 including numerous hexagonal tubular cells 26, 44, 45 and a pair of the sealing plate portions 27, 28, 46, 47 sandwiching the honeycomb portions 24, 42 from both sides (outer side and inner side).

The cells 26, 44, 45 are each formed like a hexagonal tube. Among regular polygons that can be arranged leaving no space therebetween, the hexagon has the largest area (volume) when put in a circle that contacts all the vertices of the polygon. Thus, when numerous hexagons are arranged leaving no space, as the cells 26, 44, 45 in the honeycomb portions 24, 42, the total length of the partition walls 25, 43 is the shortest possible among the cases of such regular polygons. This reduces the amount of the material of the partition walls 25, 43. Accordingly, the weight of the honeycomb structural bodies 23, 41 is further reduced.

(iv) In the area R, which is located in the vicinity of and on the inner side of the first door component 22, the second door component 34 is formed by a pair of the vertical frame portions 35, 36, which are located at front and rear opposite positions in the outer periphery, and a pair of the lateral frame portions 37, 38, which extend between the vertical frame portions 35, 36.

In other words, the second door component 34 is formed substantially like a rectangular frame, and the area surrounded by the second door component 34 in the area R define an opening.

Therefore, compared to a case where the second door component 34 is formed over the entire the area R, the front door 20 is lighter.

Further, the door main body 21 of the front door 20 has high strength because of the following reasons.

(I) The first door component 22 is entirely constructed by the honeycomb structural body 23, and the second door component 34 is entirely constructed by the honeycomb structural body 41 (refer to FIG. 5).

The honeycomb structural bodies 23, 41 include the honeycomb portions 24, 42, which are composed of numerous tubular cells 26, 44, 45 separated by the partition walls 25, 43, and a pair of the sealing plate portions 27, 28, 46, 47 located on both sides (the outer side and the inner side) of the honeycomb portions 24, 42.

Although the sealing plate portions 27, 28, 46, 47 are not very resistant to bending stress, the cells 26, 44, 45 of the honeycomb portions 24, 42 are not easily expanded or contracted when a load of, for example, an impact, is applied to the front door 20 from the outside of the vehicle, and the load is transmitted to the honeycomb structural bodies 23, 41. That is, the force that is applied to and acts to bend the sealing plate portions 27, 28, 46, 47 acts to expand or contract the honeycomb portions 24, 42. The honeycomb portions 24, 42 show high strength against the expanding and contracting force. As a result, the honeycomb structural bodies 23, 41 have high rigidity and are resistant to deformation.

(II) Since the second door component 34 is arranged such that its base portion 32 overlaps the inner side of the first door component 22, the combined height of the cells 26, 44 (the sum of the distance between the sealing plate portions 27, 28 and the distance between the sealing plate portions 46, 47) is substantially increased.

In general, the higher the cells, the more increased the strength of a honeycomb structural body becomes. Thus, since the actual combined height of the cells 26, 44 is substantially increased, the strength of the door main body 21 is increased, accordingly. Specifically, the strength of the door main body 21 is greater than that in a case where the door 21 is formed by either one of the first door component 22 or the second door component 34, particularly, a case where the door 21 is formed by only the first door component 22, which defines the appearance of the front door 20.

(III) The two sealing plate portions 28, 46 are located between the honeycomb portion 24 of the first door component 22 and the honeycomb portion 42 of the second door component 34. Thus, the combined thickness of the sealing plate portions 28, 46 between the honeycomb portions 24, 42 is substantially doubled. As a result, the strength of the door main body 21 when the sealing plate portions 28, 46 are located between the honeycomb portions 24, 42 is greater than that in the case where a single sealing plate portion (one of the sealing plate portions 28, 46) is located between the honeycomb portions 24, 42.

(IV) When the honeycomb structural body 23, 41 are joined to each other by adhesion, adhesive is located between the joint portion (between the adjacent sealing plate portions 28, 46). The layer of the adhesive also contributes to the increase in the strength of the door main body 21.

(V) Reinforcement fibers are contained in the first door component 22 and the second door component 34, which are made of synthetic resin.

As described in items (I) to (V), the strength of the door main body 21 is increased. Thus, when a load caused, for example, by an impact, is applied to the door main body 21 of the front door 20 from the outside of the vehicle, the load is reliably received by the first door component 22 and the second door component 34.

Particularly, the base portion 32 of the second door component 34 is formed like a rectangular frame by the front and rear vertical frame portions 35, 36 and the upper and lower lateral frame portions 37, 38. In an outer peripheral portion of the area R, which is located in the vicinity of and on the inner side of the first door component 22, the vertical frame portions 35, 36 are located in the front and rear opposite portions in the outer periphery. That is, the vertical frame portions 35, 36 are located in the vicinity of and on the outer side of the peripheral edge of the opening 12 in the vehicle body 11. Also, the lateral frame portions 37, 38 extend between the front and rear vertical frame portions 35, 36. The lateral frame portion 38 of the lateral frame portions 37, 38 passes through a vertical center portion of the area R. Therefore, when a load is applied to the door main body 21, the load is transmitted to the upper and lower frame portions 37, 38 and then to the front and rear frame portions 35, 36 in the base portion 32 of the second door component 34. The load is transmitted, through the periphery (the front edge and the rear edge) of the opening 12, to the body 11 having high rigidity located on the inner side of the vertical frame portions 35, 36.

Even if some of the numerous cells 26, 44, 45 in the honeycomb structural body 23, 41 are crushed, the crushing force is hardly transmitted to the other cells 26, 44, 45. Thus, even if a part of the first door component 22 or a part of the second door component 34 is scratched, the remainder of the first door component 22 or the remainder of the second door component 34 is hardly scratched.

Further, the impact beam 62, which is formed of fiber-reinforced resin and adhered to the inner side of the first door component 22, contains long fibers. Thus, compared to the case where the impact beam 62 is formed of a fiber-reinforced resin containing fibers of lengths equivalent to those of the fibers in the first door component 22, the impact beam 62 has higher rigidity. The impact beam 62 therefore receives load from the outside of the vehicle without being deformed.

The front door 20 according to the first embodiment has the following advantages.

(1) The honeycomb structural bodies 23, 41 are constructed by the honeycomb portions 24, 42 formed by numerous tubular cells 26, 44, 45 separated by the partition walls 25, 43 and the sealing plate portions 27, 28, 46, 47 located on both sides (the outer side and the inner side) of the honeycomb portions 24, 42 (refer to FIG. 5).

The outer side portion of the door main body 21 in the front door 20 is constructed by the synthetic resin first door component 22, which is entirely constructed by the honeycomb structural body 23. On the inner side of the first door component 22 of the door main body 21, the base portion 32 of the second door component 34 is located. The base portion 32 of the second door component 34 is entirely constructed by the honeycomb structural body 41. The inner side functional parts are fastened to the second door component 34, which is made of synthetic resin. The second door component 34 and the first door component 22 located on the outer side of the second door component 34 are joined to each other at a part of the sealing plate portions 28, 46 adjacent to the door components 34, 22 (refer to FIG. 7).

The combined height of the 26, 44 are substantially increased. As a result, the strength of the door main body 21 is higher than that in the case where the door main body 21 is formed by a single door component (a single honeycomb structural body). The substantial combined thickness of the sealing plate portions 28, 46 between the honeycomb portions 24, 42 is doubled. Therefore, compared to the case where a single sealing plate portion 28, 46 is located between the honeycomb portions 24, 42 is provided, the strength of the door main body 21 is increased.

In this manner, the front door 20 of reduced weight and increased strength is obtained. The weight reduction of the front door 20 leads to weight reduction of a vehicle using the front door 20. This improves the fuel economy of the vehicle.

(2) The window frame portion 33, which forms an upper portion of the door main body 21 of the front door 20, is formed as a part of the second door component 34. The window frame portion 33 is entirely constructed by the honeycomb structural body 41 (refer to FIG. 5). Thus, the weight of the window frame portion 33 is reduced, and the front door 20 is further lightened.

(3) In the area R, which is located in the vicinity of and on the inner side of the first door component 22, at least a part of the second door component 34 passes through a vertical center portion of the area R, and reaches the front and rear opposite portions in the outer periphery of the area R (refer to FIG. 1). This structure is achieved by the lower lateral frame portion 38. Load that is transmitted to the second door component 34 via the first door component 22 is reliably received by the body 11 having high rigidity.

(4) As a part of the base portion 32 of the second door component 34, a pair of the vertical frame portions 35, 36 are provided in the front and rear opposite portions in the outer periphery of the area R, which is located in the vicinity of and on the inner side of the first door component 22. Also, the two lateral frame portions 37, 38 extend between the front and rear vertical frame portions 35, 36 in the area R. One of the lateral frame portions 37, 38 passes through a vertical center portion of the area R.

Therefore, even if a load due to an impact is applied to the door main body 21, the second door component 34 transmits the load to the body 11 located on the inner side of the front and rear vertical frames 35, 36 mainly via the lower lateral frame portion 38 and the front and rear vertical frame portions 35, 36. Thus, the load is reliably received by the body 11 having high rigidity.

Also, the base portion 32 only includes the elongated lateral frame portions 37, 38 between the vertical frame portions 35, 36 in the area R. Therefore, compared to a case where the second door component 34 substantially occupies the whole area R, the front door 20 is lighter.

(5) The impact beam 62 is located in the vicinity of and on the inner side of the first door component 22 (refer to FIG. 1). The impact beam 62 is formed of fiber-reinforced resin having longer fiber lengths than fibers in the first door component 22. Therefore, even if a great load that could damage the first door component 22 is applied to the front door 20 from the outside, the impact beam 62 is hardly deformed. Therefore, an object that applies load to the front door 20 does not enter the passenger compartment further than the impact beam 62.

Second Embodiment

Figure 10:
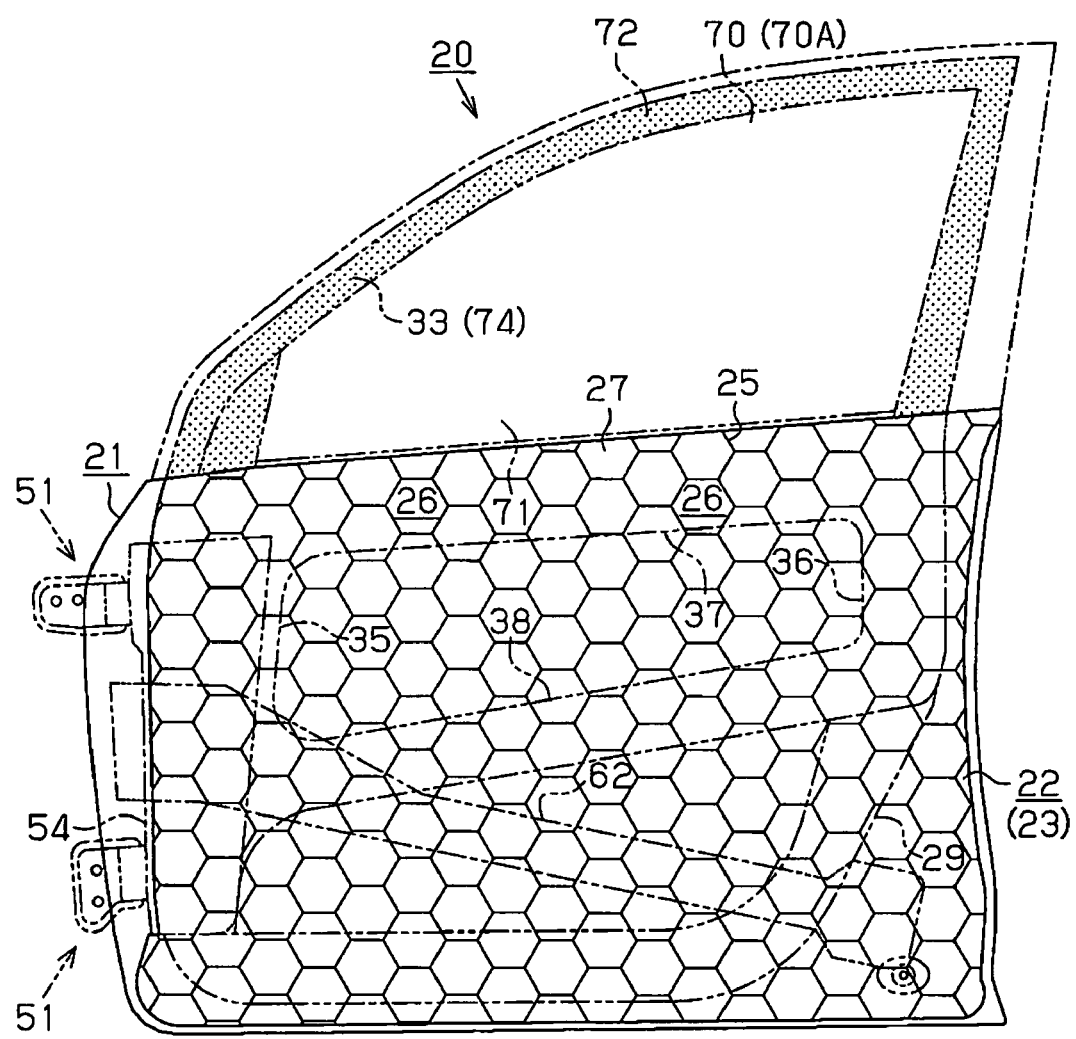
FIG. 10 is a side view illustrating a window glass and a first door component in a front door according to a second embodiment of the present embodiment.

A front door according to a second embodiment of the present invention will now be described with reference to FIGS. 10 and 11. The front door of the second embodiment has the following features in addition to those of the first embodiment.

Figure 11:
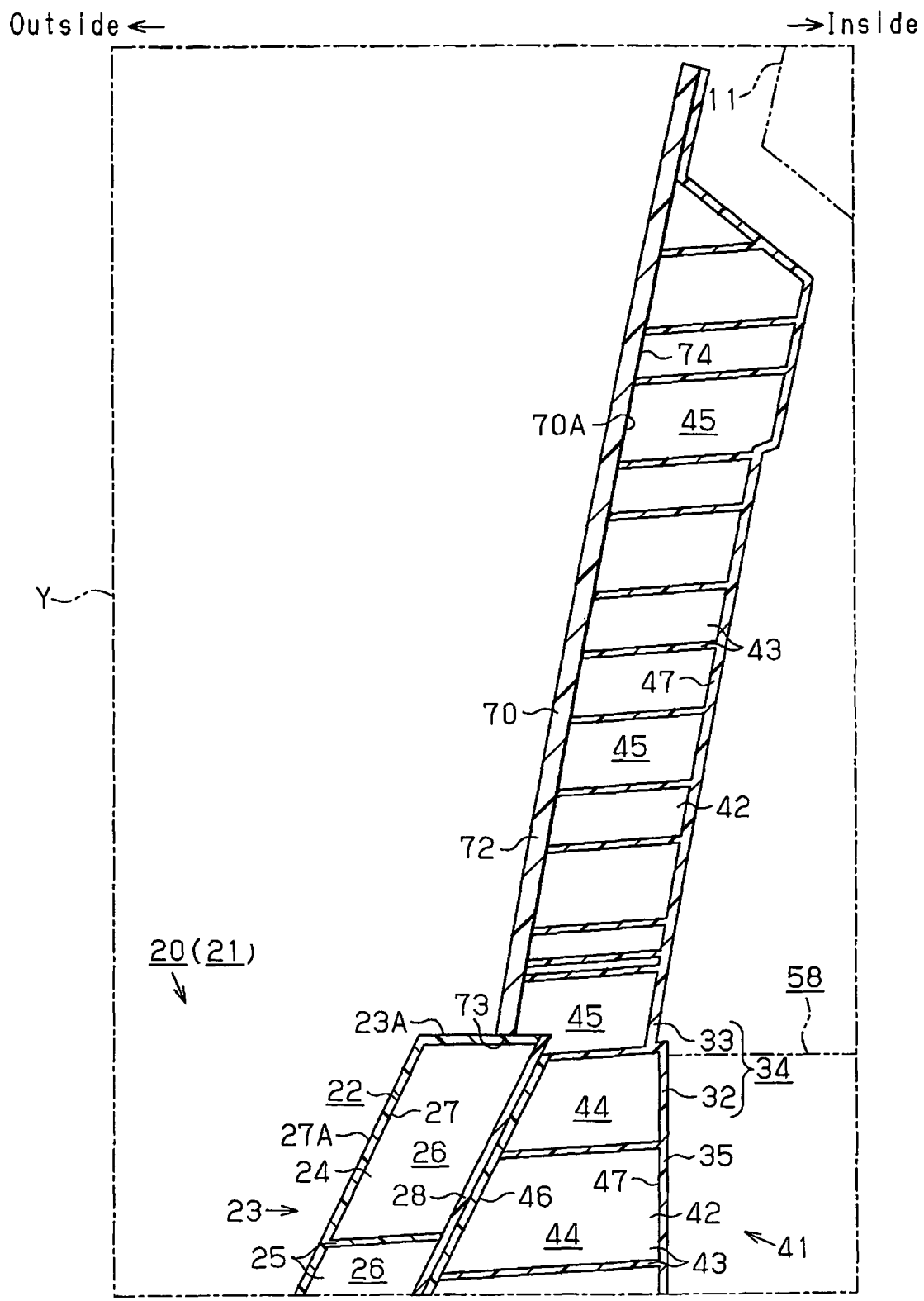
FIG. 11 is an enlarged partial cross-sectional view illustrating section Y in FIG. 5.

FIG. 11 is an enlarged view illustrating section Y in FIG. 5. As shown in FIG. 11, in the base portion 32 of the second door component 34, the sealing plate portions 46, 47 of the honeycomb structural body 41 are located on both sides (the outer side and the inner side) of the honeycomb portion 42 to seal the cells 44. The honeycomb portion 42 and the inner side sealing plate portion 47 is integrally molded by injection molding. The outer side sealing plate portion 46 is formed separately from the honeycomb portion 42 and is joined to the honeycomb portion 42 by welding or adhesion.

In contrast, although the honeycomb structural body 41 of the window frame portion 33 has the honeycomb portion 42 and the inner side sealing plate portion 47, the sealing structure of the honeycomb portion 42 in the window frame portion 33 is different from the sealing structure of the honeycomb portion 42 in the base portion 32. Specifically, a portion of the base portion 32 that corresponds to the outer side sealing plate portion 46, that is, a portion that corresponds to the sealing plate portion 46 that seals the honeycomb portion 42 from the outer side, is formed by a part of the window glass 70. The portion of the window glass 70 refers to an area 72 of the periphery of the window glass 70 except for a lower end portion 71 (area indicated by halftone dots in FIG. 10). In this manner, in the window frame portion 33 of the second door component 34, the sealing plate portion 46 is replaced by a part of the window glass 70 (the area 72). In the area 72, the window glass 70 fixed to the window frame portion 33 and the honeycomb portion 42 with adhesive from the outer side. A lower end surface 73 of the window glass 70 is fixed with adhesive to an upper end surface 23A of the honeycomb structural body 23 of the first door component 22 from above (refer to FIG. 1).

Further, in an area of the honeycomb portion 42 of the window frame portion 33 that is located on the outer side in the window glass 70, that is, in the area 72 in the periphery of the window glass 70 except for the lower end portion 71, a concealing portion 74 for concealing the inner side of the area 72 is provided. The concealing portion 74 is shown by bold solid line in FIG. 11 (likewise the concealing portion 74 is also shown by solid bold lines in FIGS. 17(A), 17(B), 18(A), and 18(B)). The concealing portion 74 is formed by applying black paint on an inner surface 70A of the window glass 70, that is, by performing blackout treatment. The concealing portion 74 may be formed by applying opaque, for example, black tape or film on the inner surface 70A of the window glass 70.

The front door 20 according to the second embodiment, which is configured as described above, is further lightened for the following reason in addition to the reasons of items (i) to (iv) shown above.

(v) The honeycomb portion 42 of the window frame portion 33 in the second door component 34 is sealed by a part of the window glass 70. More specifically, unlike the base portion 32, the outer side of the honeycomb structural body 41 of the window frame portion 33 is sealed not by the sealing plate portion 46, but by the area 72 of the periphery of the window glass 70, except for the lower end portion 71.

The strength of the front door 20 is further increased for the following reasons in addition to the above reasons (I) to (V).

(VI) In place of the sealing plate portion 46, the window glass 70 is fixed to the honeycomb portion 42 of the window frame portion 33 by adhesion at the area 72 in the periphery except for the lower end portion 71.

In general, in a honeycomb structural body, a pair of sealing plate portions are located on both sides (the outer side and the inner side) of a honeycomb portion and fixed to the honeycomb portion. The sealing plate portions thus function as reinforcing members and improve the strength of the honeycomb structural body. Therefore, if a part of the window glass 70 is directly fixed to the honeycomb portion 42, the window glass 70 functions as a reinforcing member. In other words, a part of the window glass 70 functions as a reinforcing member of the sealing plate portion 46. This ensures the strength of the honeycomb structural body 41.

Since the window glass 70 of the front door 20 is located on the outer side of the honeycomb portion 42, the interior of the passenger compartment is visible from the outside through the window glass 70. In the area 72 of the window glass 70, the honeycomb portion 42 is located on the inner side of the window glass 70. Therefore, if the area of the window glass 70 is transparent, the honeycomb portion 42 and the adhered portion between the honeycomb portion 42 and the window glass 70 are visible from the outside of the vehicle, which spoils the appearance of the periphery of the window glass 70. However, the concealing portion 74 is provided in the area 72, which is located on the outer side of the honeycomb portion 42 of the window glass 70. Thus, since the concealing portion 74 covers the area 72 of the window glass 70, the honeycomb portion 42 is invisible from the outside of the vehicle.

Therefore, the second embodiment has the following advantages in addition to the advantages (1) to (5) of the first embodiment.

(6) Sealing of a part of the sealing of the honeycomb structural body 41 (a part of the window frame portion 33) in the second door component 34 is achieved by a part of the window glass 70 (the area 72 of the periphery except for the lower end portion 71). Therefore, compared to the case where the window glass 70 has no sealing function, the weight of the front door 20 is reduced. In a simple combination of the window glass 70 and the sealing plate portion 46, the sealing plate portion 46 extends to the periphery of the window glass 70, and the weight of the sealing plate portion 46 is increased. The further weight reduction of the front door 20 leads to weight reduction of a vehicle using the front door 20. This improves the fuel economy of the vehicle.

(7) The window glass 70 is fixed to the honeycomb portion 42 of the window frame portion 33. Thus, the window glass 70 serves as a reinforcing member of the sealing plate portion 46. As a result, the strength of the honeycomb structural body 41 is ensured while reducing the weight of the front door 20. Particularly, the use of adhesive in the second embodiment allows the window glass 70 to be reliably and firmly fixed to the honeycomb portion 42.

(8) The concealing portion 74 is provided in the area 72, which is located on the outer side of the honeycomb portion 42 of the window glass 70. Therefore, the concealing portion 74 conceals the inner side honeycomb portion 42 of the window glass 70 and the adhesion portion between the honeycomb portion 42 and the window glass 70. Therefore, although the window glass 70 seals the honeycomb portion 42, the appearance of the front door 20 is not spoiled.

Third Embodiment

A third embodiment of the present invention will now be described with reference to FIGS. 12 to 16.

According to the third embodiment, a window glass 70 is not fixed to a door main body 21 including a window frame portion 33 as shown in FIGS. 13 to 16. The window glass 70 is selectively lifted and lowered by a window regulator (not shown). In this regard, the third embodiment is significantly different from the first and second embodiments, in which the window glass 70 is fixed to the door main body 21 and is not lifted or lowered. An accommodation space 80 for accommodating the window glass 70 is defined between the first door component 22 and the second door component 34. Although not illustrated in FIG. 13 or 16, the first door component 22 and the second door component 34 are joined to each other, for example, by welding or adhesion, at portions of the adjacent sealing plate portions 28, 46 of the honeycomb structural bodies 23, 41 of the door components 22, 34 except for the accommodation space 80.

Figure 12:
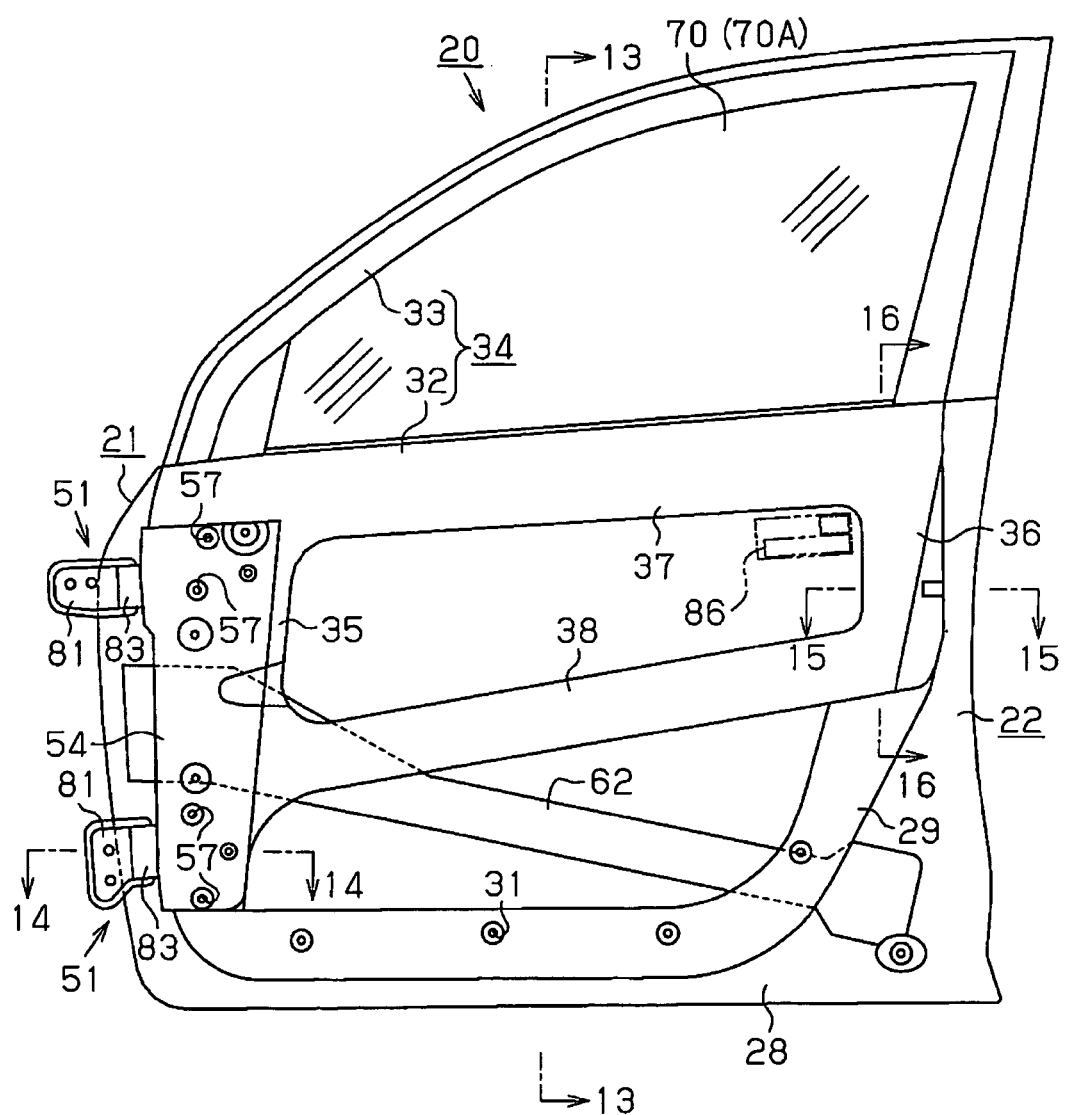
FIG. 12 is a side view as viewed from the inside of a vehicle, illustrating a front door according to a third embodiment of the present invention with the door trim removed.
Figure 13:
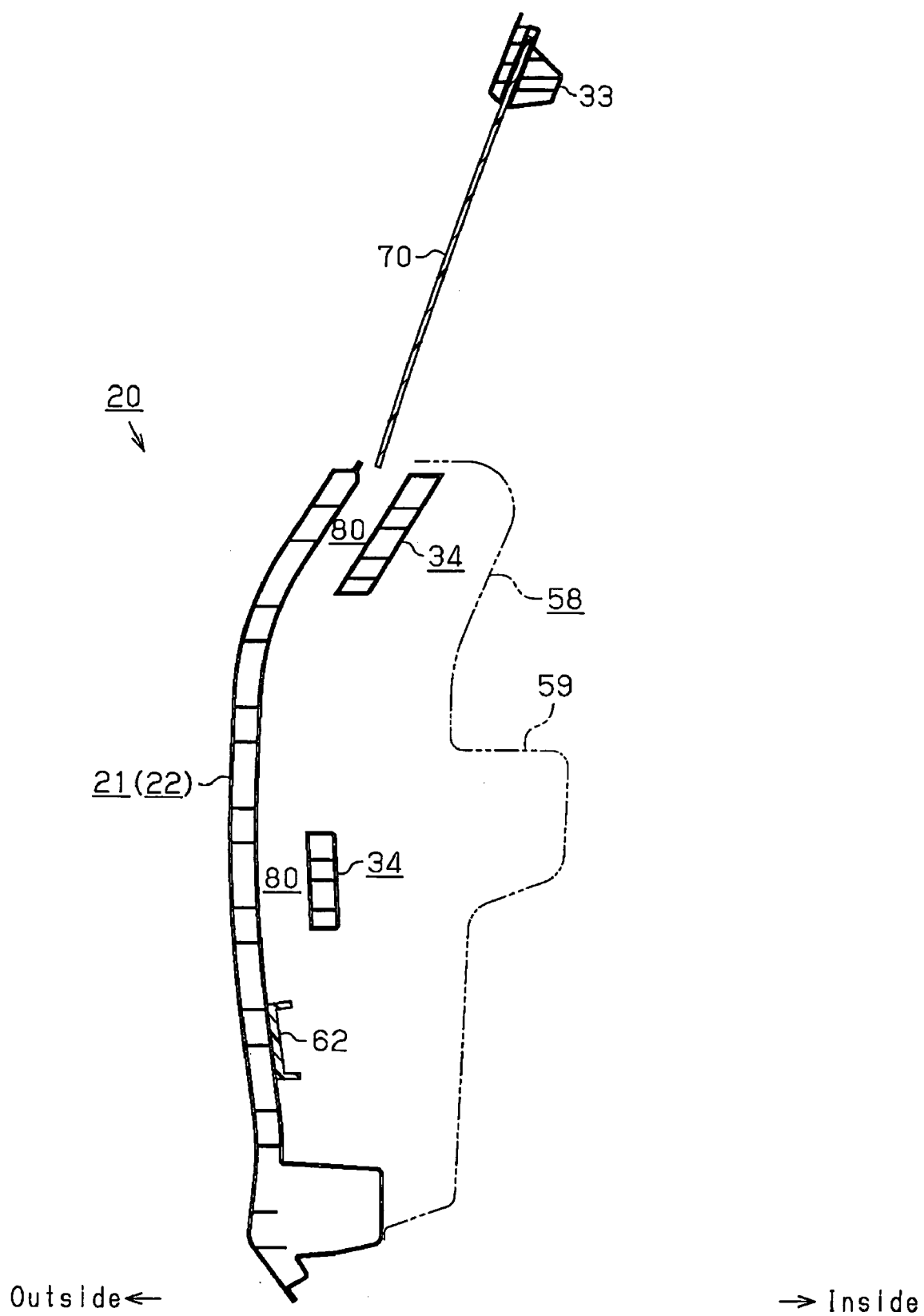
FIG. 13 is a cross-sectional view taken along line 13-13 of FIG. 12.
Figure 14:
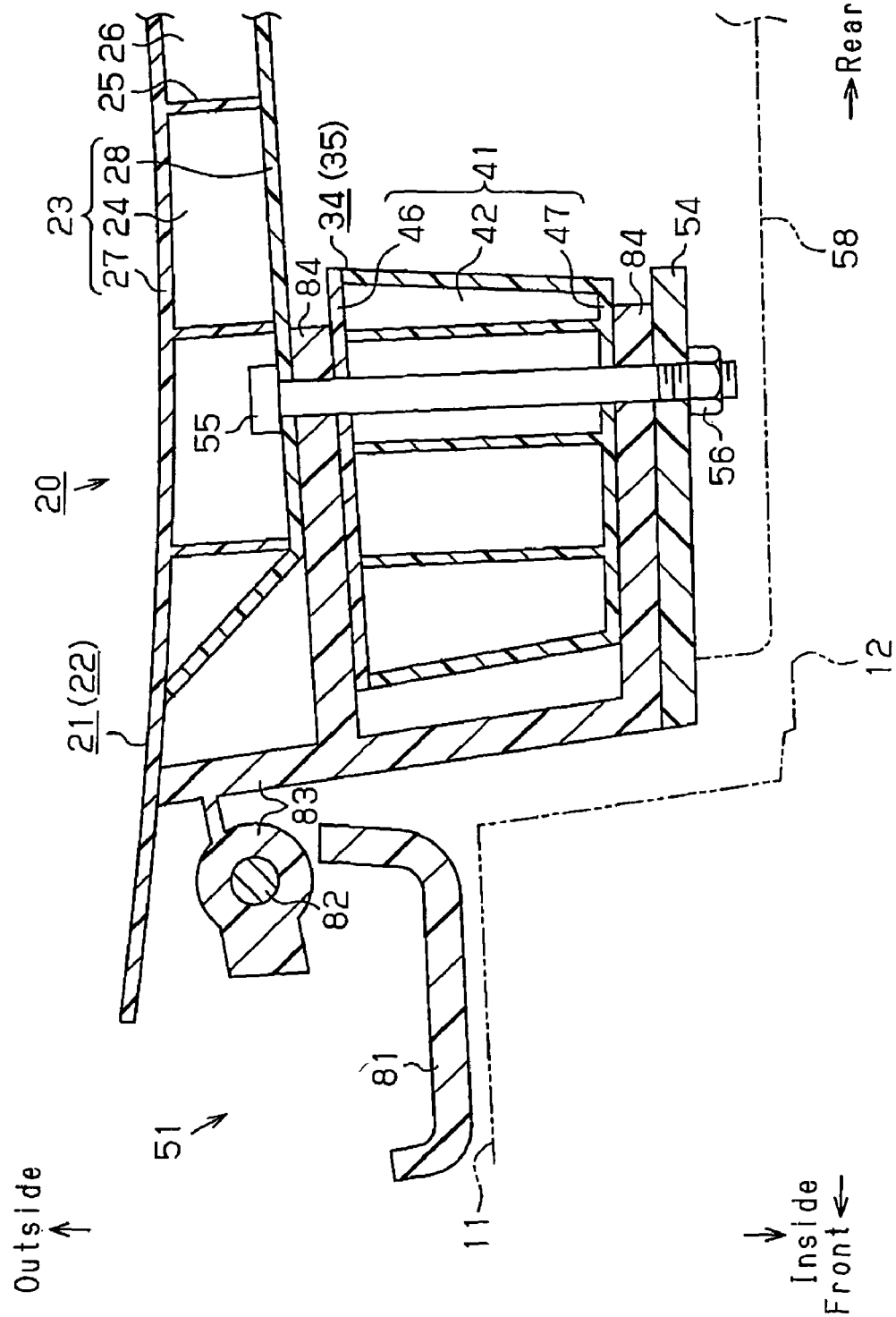
FIG. 14 is a cross-sectional view taken along line 14-14 of FIG. 12.

The following description partially overlaps that in the first embodiment. As shown in FIGS. 12 and 14, a pair of door hinges 51 are provided on the front door 20 to rotatably support the front door 20 to the vehicle body 11, so that the front door 20 is selectively opened and closed. Specifically, the door hinges 51 are located between the front end portion of the door main body 21 and the body 11 and spaced from each other in the vertical direction. The door hinges 51 have the same structure. Each door hinge 51 has a body side member 81 attached to the body 11 and a door side member 83, which is attached to the door main body 21 and is rotatably supported by the body side member 81 with a pin 82. In the door side member 83 of each door hinge 51, a pair of plate-like holding portion 84 extend rearward and parallel to each other from two positions that are spaced apart in the lateral direction of the vehicle (widthwise direction). The holding portions 84 hold the front vertical frame portion 35 of the second door component 34 from both sides (the outer side and the inner side) in the lateral direction of the vehicle (the widthwise direction).

Further, the coupler portion 54 is located on the inner side of each of the upper and lower body side members 81. The coupler portions 54 are made of synthetic resin and are formed like plates extending vertically. The door side member 83 of the door hinge 51 is fastened to the vertical frame portion 35 by a bolt 55 and a nut 56 together with the vertical frame portion 35. The door side members 83 are coupled to each other by the coupler portion 54. The use of the coupler portion 54 increases the strength and rigidity of the door side members 83.

Figure 15:
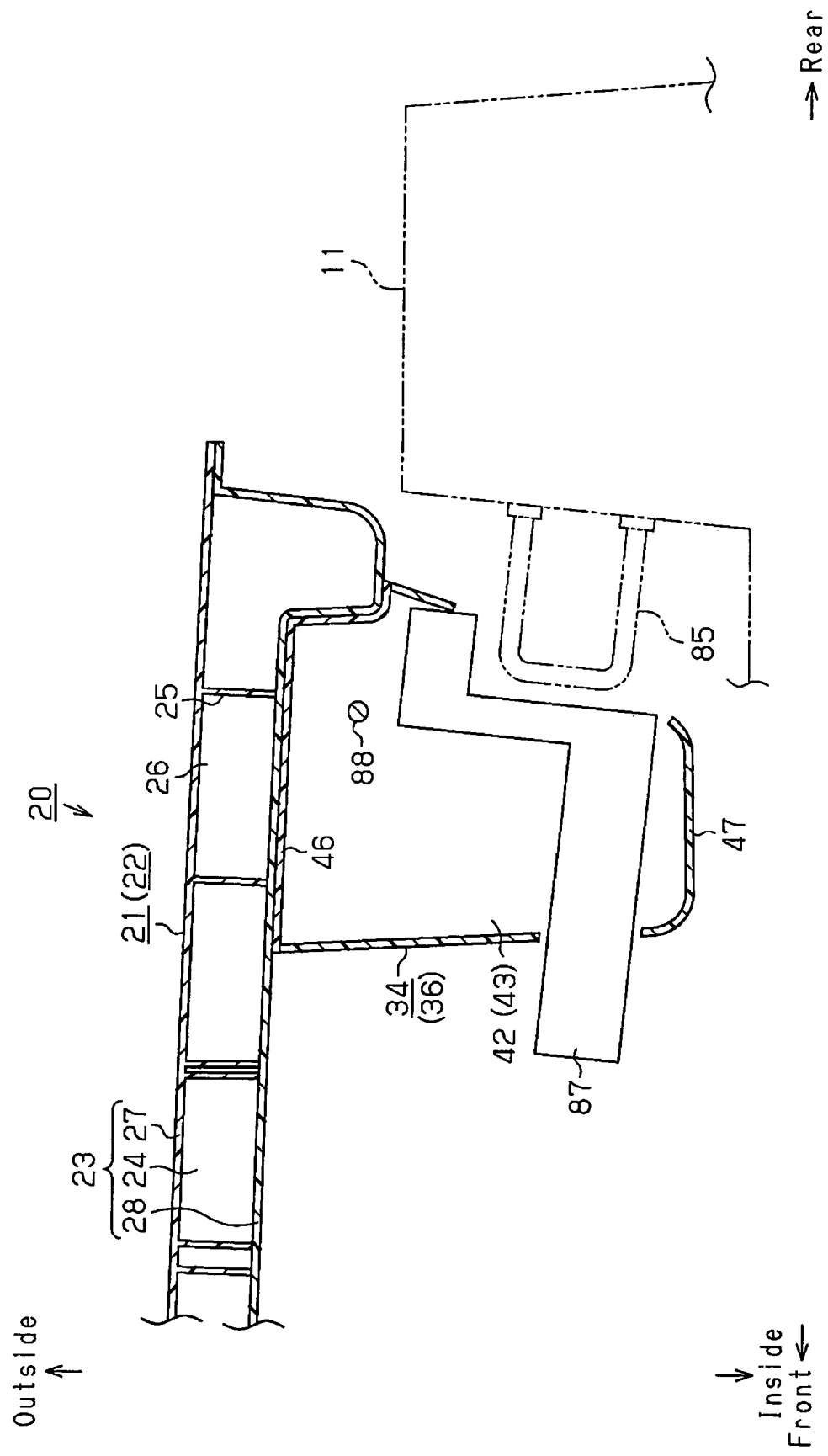
FIG. 15 is a cross-sectional view taken along line 15-15 of FIG. 12.
Figure 16:
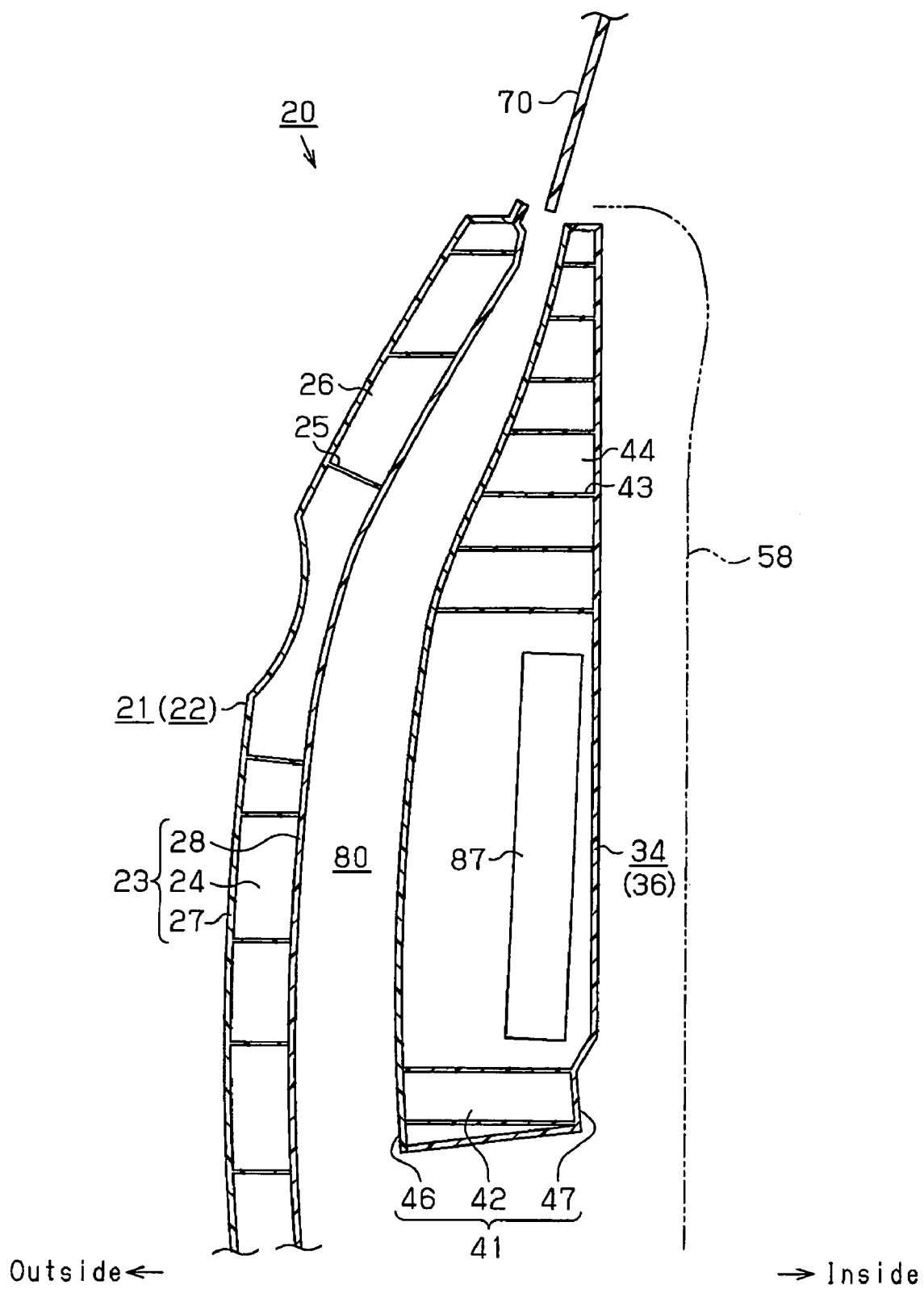
FIG. 16 is a cross-sectional view taken along line 16-16 of FIG. 12.

Although not described in the first and second embodiments, as shown in FIGS. 15 and 16, a door lock striker 85 is provided in the vicinity of the rear end of the opening 12 of the vehicle body 11 (refer to FIGS. 5 and 6). An inside handle (refer to alternate long and two short dashes line in FIG. 12), which is a lever type, is installed in the door trim 58. When opening the front door 20, an occupant manipulates the inside handle 86. A door lock mechanism 87 is arranged in the rear vertical frame portion 36, which is in a rear portion of the second door component 34. More specifically, the door lock mechanism 87 is a mechanism that engages a latch with the door lock striker 85 to hold the front door 20 in the closed state, or lock the front door 20, and unlocks the front door 20 in response to manipulation of the inside handle 86 by an occupant. In FIG. 15, the numeral 88 denotes a cable that is a part of a mechanism for transmitting action of the inside handle 86 to the door lock mechanism 87.

The vertical frame portion 35, to which the door side members 83 of the door hinges 51 are attached, and the vertical frame portion 36, which has the door lock mechanism 87, are constructed by the honeycomb structural body 41 constructed by the honeycomb portion 42 and a pair of the sealing plate portions 46, 47. The honeycomb portion 42 is formed by numerous cells 44, which are hexagonal tubes divided by partition walls 43.

Other than the features described above, the third embodiment is the same as the first embodiment. Therefore, like or the same reference numerals are given to those components that are like or the same as the corresponding components of the first embodiment and detailed explanations are omitted.

In the front door 20 of the above described third embodiment, parts surrounding the door hinges 51, which are directly related to opening and closing of the front door 20, and parts surrounding the door lock mechanism 87 are both constructed by the honeycomb structural body 41 and therefore have high strength and high rigidity. The honeycomb structural body 41 serves to reinforce the door hinges 51, particularly the door side members 83 and the door lock mechanism 87.

Therefore, the third embodiment has the following advantages in addition to the advantages (1) to (5) of the first embodiment.

(9) The door hinges 51, which serve as fulcrums when the opening 12 is selectively opened and closed, are located in the vicinity of the vertical frame portion 35 of the second door component 34, which is a portion that is constructed by the honeycomb structural body 41 in the door main body 21 (refer to FIG. 14). The strength and rigidity of the door hinge 51, particularly, of the door side members 83 are increased by the honeycomb structural body 41 located in the vicinity. As a result, the door side members 83, a portion of the second door component 34 in the vicinity of the door side members 83 (the vertical frame portion 35) are inhibited from being bent, deformed, and damaged.

(10) The door lock mechanism 87, which maintains the closed state of the opening 12, is located in the vicinity of the vertical frame portion 36 of the second door component 34, which is a portion that is constructed by the honeycomb structural body 41 in the door main body 21 (refer to FIGS. 15 and 16). The strength and rigidity of the door lock mechanism 87 are increased by the honeycomb structural body 41 located in the vicinity. As a result, the door lock mechanism 87, a portion of the second door component 34 in the vicinity of the door lock mechanism 87 (the vertical frame portion 36) are inhibited from being bent, deformed, and damaged.

The present invention may be embodied in the following forms.

Modifications Related to First to Third Embodiments (a) The honeycomb structural body 23 may have a shape restoration function. Specifically, when an impact is applied to the front door 20 from the outside of the vehicle and load is applied to the first door component 22, the honeycomb structural body 23 is bent. The honeycomb structural body 23 may be configured to restore the original shape when the load is removed. For example, like the configuration of item (n), which will be described below, a decorative laminate made of synthetic resin may be provided on the outer side of the first door component 22. The decorative laminate may be arranged to slightly spaced from the outer side surface of the first door component 22, and may partially contact and be fixed to the first door component 22.

(b) Instead of fiber-reinforced resin, the impact beam 62 may be formed by metal (a steel plate).

(c) The first door component 22 and the second door component 34 may be configured so as to be joined to each other at least at a part of the adjacent sealing plate portions 28, 46 of the honeycomb structural bodies 23, 41. Alternatively, the door components 22, 34 may be joined to each other in the entirety of the opposite portions of the sealing plate portions 28, 46.

(d) Other than the vehicle front door 20 described above, the vehicle door of the present invention may be used as any door, for example, a rear door or a tail door.

(e) In the door main body 21, the kind of fiber-reinforced resin used for forming the components, particularly the kind of reinforcement member (fibers), may vary according to each component of the door main body 21. Generally, the fiber-reinforced resin has higher strength when carbon fibers are used as reinforcement than when glass fibers are used as reinforcement. On the other hand, the former fiber-reinforced resin is generally more inexpensive than the latter. Among the components of the door main body 21, ones that require particularly high strength may be formed of fiber-reinforced resin using carbon fiber reinforcement, and the other components may be formed of fiber-reinforced resin using glass fiber reinforcement.

For example, in the first to third embodiments, in which the door main body 21 is constructed by the two honeycomb structural bodies 23, 41, the honeycomb portion 24 in the honeycomb structural body 23, which requires high strength, and the outer side sealing plate portion 27, which is integrated with the honeycomb portion 24 are formed of fiber-reinforced resin having carbon fiber reinforcement. The other components, which are in this case the inner side sealing plate portion 28 in the honeycomb structural body 23 and the entire honeycomb structural body 41 are formed of fiber-reinforced resin having glass fiber reinforcement.

(f) The door main body 21 may be entirely constructed by a synthetic resin honeycomb structural body.

(g) The second door component 34 may be modified as long as it forms a portion on the inner side of the first door component 22 in the door main body 21. Therefore, the window frame portion 33 may be separately from the second door component 34. In other words, the second door component 34 may be configured without the window frame portion 33.

(h) Only a part of the window frame portion 33 may be constructed by the honeycomb structural body 41. Alternatively, the entire window frame portion 33 may be formed by a component different from the honeycomb structural body 41.

(i) The functional parts located on the inner side of the second door component 34 are not limited to the door hinges 51 and the door trim 58, but may be other parts.

(j) The second door component 34 may have any structure as long as it includes a member that extends through a vertical center portion of the area R, which is located in the vicinity of and on the inner side of the first door component 22, and reaches a portion in the vicinity of opposite portions in the outer periphery of the area R. Therefore, the shape of the second door component 34 may be changed as long as the above condition is met. For example, the vertical width of the lateral frame portion 38 may be increased compared to those in the above embodiments. Also, a part of the second door component 34 may be inclined downward or upward toward the front end, while passing through a center portion of the area R.

(k) In place of the lateral frame portions 37, 38 of the second door component 34, a pair of frame members extending in the front and rear direction may be provided at upper and lower opposite portions in the outer periphery of the area R, which is located in the vicinity of and on the inner side of the first door component 22. In place of the vertical frame portion 35, 36 of the second door component 34, a plurality of elongated bridge portions may extend vertically between the frame portions of the area R. In this case, one of the bridge portions is arranged to pass through the center portion of the area R. This configuration achieves the same advantage as that of the item (4) shown above.

(l) In the first to third embodiments, the rear vertical frame portion 36 may extend to a position below (a position lower than) the lateral frame portion 38 like the front vertical frame portion 35. In the case where the vertical frame portions 35, 36 extend to positions below the lower lateral frame portion 38, an additional bridge portion may extend between the lower end portions of the vertical frame portions 35, 36. The upper lateral frame portion 37 may be provided at a position lower than the upper ends of the vertical frame portions 35, 36 and higher than the lower lateral frame portion 38.

<Modifications Related to First Embodiment>

(m) In a pair of the sealing plate portions 27, 28 (46, 47), the one that is integrally molded with the honeycomb portion 24 (42) and the one joined to the honeycomb portion 24 (42) may be interchanged.

(n) In the first door component 22, the sealing plate portion 27 (or 28) may be fixed to the honeycomb portion 24 by vibration welding. At the vibration welding, the heat due to vibration denatures (whitens) the sealing plate portion 27 (28), which may influence the surface of the sealing plate portion 27 (or 28) and leave a trace. Therefore, if the sealing plate portion 27 (or 28) that is fixed by vibration welding is on the outer side of the honeycomb portion 24, the trace will appear on the outer side surface of the front door 20. This spoils the appearance of the front door.

On the other hand, in the case where the honeycomb portion 24 and the sealing plate portion 27 (or 28) are molded integrally, shrinkage of the honeycomb portion 24 (cells 26) after molding can create sink marks on the surface (surface opposite to the honeycomb portion 24) of the sealing plate portion 27 (or 28). Therefore, if the sealing plate portion 27 (or 28) that is integrally molded with the honeycomb portion 24 is on the outer side surface of the honeycomb portion 24, the sink marks will appear on the outer surface of the front door 20. This spoils the appearance of the front door.

Therefore, regardless of the positional relationship between the honeycomb portion 24 and the sealing plate portion 27 (or 28), a synthetic resin decorative laminate may be additionally provided on the outer side of the first door component 22. Thus, even if a trace of whitening or sink marks appear on the first door component 22, those traces are not visible from the outside of the vehicle. The appearance of the front door 20 is therefore reliably maintained to a desirable state.

In the case where a decorative laminate is used, the decorative laminate is preferably slightly spaced from the outer side surface of the first door component 22, and partially fixed to the first door component 22. When a load that is not significantly great is applied to the vehicle door from the outside of the vehicle due to a collision, the decorative laminate is temporarily bent. When the load is removed thereafter, the decorative laminate restores the state before the bending by its own elastic restoring force.

<Modifications Related to Second Embodiment>

(o) The window glass 70 and the honeycomb portion 42 are both made of synthetic resin. Therefore, the window glass 70 may be fixed to the honeycomb portion 42 by welding instead of by adhesion.

(p) Instead of synthetic resin, the window glass 70 may be inorganic glass formed of inorganic material. Even in this case, weight reduction is achieved by sealing a part of the honeycomb portion 42 with a part of the window glass 70.

When a window glass 70 made of inorganic glass is fixed to the synthetic resin honeycomb portion 42, an adhesive is used as in the case of the second embodiment.

(q) The position of the concealing portion 74 is not limited as long as it is located on the outer side of the honeycomb portion 42. Thus, the concealing portion 74 may be formed in an area larger than the area described in the embodiment.

(r) Instead of on the inner surface 70A of the window glass 70, the concealing portion 74 may be formed on the outer surface (surface on the outer side).

(s) To construct the door main body 21, the first door component 22 and the second door component 34 may be formed integrally. FIGS. 17(A) and 17(B) show examples of this modification. In these examples, the structure of the door main body 21 is similar to that of the second door component 34 according to the second embodiment with a thickness increased in the lateral direction (widthwise direction) of the vehicle. Therefore, in the following description, components that are similar to the corresponding components in the second embodiment are given the same reference numerals used in the description of the second door component 34.

FIG. 17(A) shows an example of the door main body 21 in which the honeycomb portion 42 is integrated with the inner side sealing plate portion 47 both at the base portion 32 and the window frame portion 33. At the base portion 32, the honeycomb portion 42 is fixed to the outer side sealing plate portion 46 by adhesion, and at the window frame portion 33, the honeycomb portion 42 is fixed to the window glass 70 by adhesion.

FIG. 17(B) shows an example of the door main body 21 that has a honeycomb portion 42A in the window frame portion 33 that is integrally molded with the inner side sealing plate portion 47, and a honeycomb portion 42B in the base portion 32 that is integrally molded with the outer side sealing plate portion 46. The honeycomb portion 42A in the window frame portion 33 is fixed to the window glass 70 by adhesion, and the honeycomb portion 42B in the base portion 32 is fixed to the inner side sealing plate portion 47 by adhesion.

In either of the cases of FIGS. 17(A) and 17(B), the outer surface 46A of the outer side sealing plate portion 46 forms an ornamental surface of the door main body 21 (the front door 20). The lower end surface 73 of the window glass 70 is fixed to an upper end surface 46B of the sealing plate portion 46 from above by adhesive.

(t) In the modification of the item (s), the thickness of partition walls 44A may be greater than that of the other partition walls 44B. This configuration increases the strength of the partition walls 44A in the door main body 21 (the base portion 32) compared to the other portions. Compared to a case where the impact beam 62 is fixed to the honeycomb structural body 41 after the honeycomb structural body 41 is formed, the strength of the honeycomb structural body 41 is easily increased.

However, after the honeycomb portion 42 and one of the sealing plate portions are molded integrally, sink marks as described above may appear on the surface of the sealing plate portion (on a surface opposite to the honeycomb portion 42) due to the shrinkage of the partition wall 44A having a increased thickness. When appearing on the outer surface of the outer side sealing plate portion 46, such sink marks spoil the appearance of the front door 20. Therefore, the partition walls 44A having an increased thickness for an improved strength are preferably formed integrally with the inner side sealing plate portion 47. In this case, sink marks appear on the inner surface (the surface on the inner side) of the sealing plate portion 47 and are not visible from the outside of the vehicle. The appearance of the front door 20 is not spoiled.

The modifications described so far are applicable to the case where the door main body 21 is constructed by the first door component 22 and the second door component 34. Particularly, in the case where the above described configuration is used in the first door component 22 on the outer side, the strength of the honeycomb structural body 23 is easily increased, while inhibiting the deterioration of the appearance of the front door 20.

(u) When the door main body 21 is constructed by a single honeycomb structural body 41 as in the cases of the examples shown in FIGS. 17(A), 17(B), and 18(A), the honeycomb structural body 41 is required to have high strength. Therefore, in the modification of item (e), the honeycomb portion 42 and a sealing plate portion integrated with the honeycomb portion 42 may be formed of fiber-reinforced resin having carbon fibers as reinforcement. A sealing plate portion that is formed separately from the honeycomb portion 42 and fixed to the honeycomb portion 42, for example, by adhesive may be formed of fiber-reinforced resin having glass fibers as reinforcement.

(v) For example, as show in FIGS. 17(A), 17(B), and 18(A), an upper end portion 70B of the window glass 70 may be bent inward. The upper end portion 70B may be fixed to the sealing plate portion 47, for example, by adhesive. Alternatively, as shown in FIG. 18(B), an upper end portion 47B of the inner side sealing plate portion 47 may project outward. The upper end portion 47B of the sealing plate portion 47 may be fixed to the window glass 70, for example, by adhesive.

(w) Instead of sealing the honeycomb portion 42 of the second door component 34 with a part of the window glass 70, a part of the honeycomb portion 42 of the first door component 22 may be sealed by a part of the window glass 70.

Figure 19:
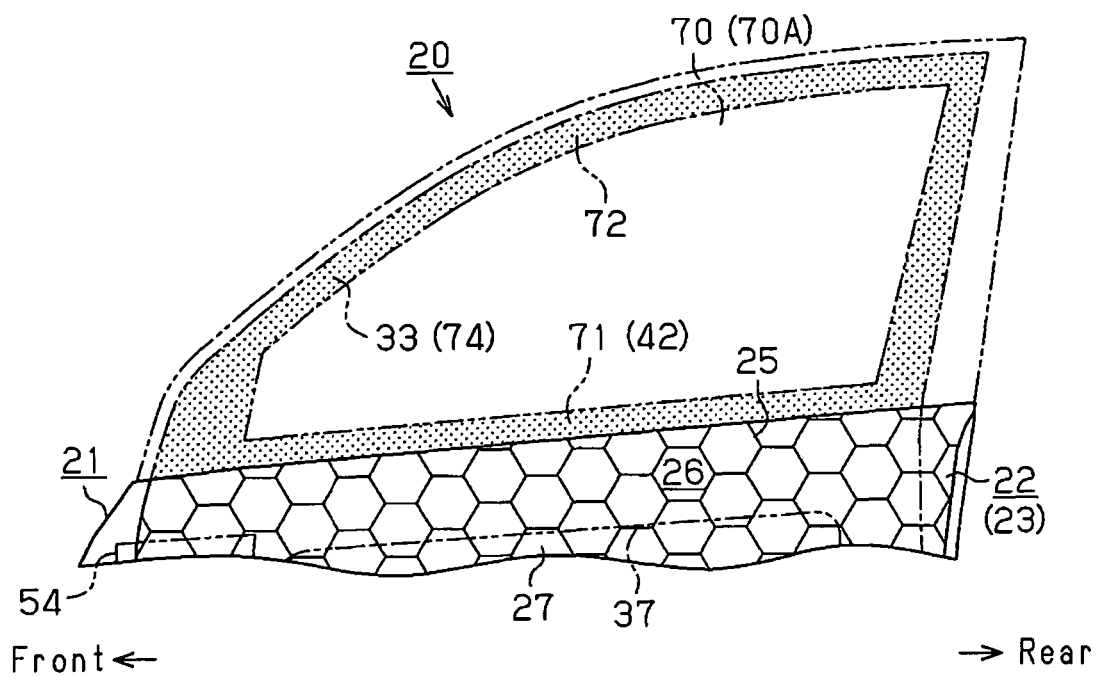
FIG. 19 is an enlarged partial cross-sectional view illustrating a window glass and a first door component according to a modification of the second embodiment.

(x) As indicated by halftone dots in FIG. 19, a honeycomb portion 42 may be provided at the lower end portion 71 of the window glass 70, and the honeycomb portion 42 may be fixed to the window glass 70. This configuration further increases the strength of the vehicle door (the front door 20). In this case also, the concealing portion 74 is preferably provided at the lower end portion 71 of the window glass 70 so that the adhered portion between the honeycomb portion 42 and the window glass 70 is concealed.

<Modifications Related to Third Embodiment>

(y) At least one of the door hinge 51 and the door lock mechanism 87 according to the third embodiment may be used in a vehicle door having a fixed window glass 70 (the first and second embodiments).

(z) One of the door hinge 51 and the door lock mechanism 87 according to the third embodiment may be provided at a position in the door main body 21 (the second door component 34) that is different from a position in the vicinity of the honeycomb structural body 41 or at a position that is not constructed by the honeycomb structural body 41.

Therefore, the present examples and embodiments are to be considered as illustrative and not restrictive and the invention is not to be limited to the details given herein, but may be modified within the scope and equivalence of the appended claims.

What is claimed is:

1. A vehicle door that selectively opens and closes an opening formed in the body of a vehicle, the vehicle door comprising:
    a door main body forming a main part of the vehicle door;
    a synthetic resin first door component that is entirely constructed by a honeycomb structural body, the first door component forming an outer side portion of the door main body; and
    a synthetic resin second door component that is entirely constructed by a honeycomb structural body and is arranged adjacent to the first door component, the second door component forming an inner side portion of the door main body, wherein a functional part on the inner side is fastened to the second door component,
    wherein each honeycomb structural body includes a honeycomb portion, which is composed of numerous tubular cells separated by partition walls, and a pair of outer side and inner side sealing plate portions located on the outer side and the inner side of the honeycomb portion, the outer side and inner side sealing plate portions sealing the cells, and
    wherein the first door component and the second door component are joined to each other at least at a part of the adjacent sealing plate portions of the honeycomb structural bodies, and
    wherein the honeycomb portion of the first door component is integrally formed with the outer side sealing plate portion of the first door component from the synthetic resin, and an outer surface of the outer side sealing plate portion forms an ornamental surface of the door main body.

2. The vehicle door according to claim 1, further comprising a window frame portion that is located in an upper portion of the door main body and is formed as a part of the second door component.

3. The vehicle door according to claim 1, wherein the outer shape of the first door component defines one area, the area has a center portion and a peripheral portion, and wherein the second door component has a portion that passes through the center portion of the one area and extends between opposite portions in the peripheral portion of the area.

4. The vehicle door according to claim 1, wherein the outer shape of the first door component defines one area, the area has a center portion and a peripheral portion, and wherein the second door component includes a pair of frame portions between opposite portions of the peripheral portion of the one area and a plurality of elongated bridge portions extending between the frame portions, and wherein one of the bridge portions is arranged to pass through the center portion of the one area.

5. The vehicle door according to claim 4, wherein the pair of the frame portions extend vertically, and wherein the bridge portions extend in the front and rear direction of the vehicle.

6. The vehicle door according to claim 1,
    wherein the first door component is formed of fiber reinforced resin,
    wherein an impact beam is provided in the door main body, and
    wherein the impact beam is formed of fiber-reinforced resin having longer fiber lengths than fibers in the first door component.

7. The vehicle door according to claim 1, further comprising a window glass attached to the second door component,
    wherein a part of the honeycomb structural body of the second door component is sealed by a part of the window glass.

8. The vehicle door according to claim 7, wherein, at a part where the window glass seals a part of the honeycomb structural body, the window glass is fixed to the honeycomb portion.

9. The vehicle door according to claim 7, wherein a part of the window glass functions as a sealing plate portion on the outer side of the honeycomb portion, and wherein a concealing portion that conceals the interior of the vehicle is provided at least on the outer side surface of the window glass that faces the honeycomb portion.

10. The vehicle door according to claim 7, wherein the door main body has a window frame portion constructed by the honeycomb structural body, and wherein the outer side of the honeycomb structural body of the window frame portion is sealed by the peripheral portion of the window glass.

11. The vehicle door according to claim 7, wherein some of the cells of the honeycomb portion are integrally formed with the inner side sealing plate, and wherein the remaining cells of the honeycomb portion are formed by thinner partition walls of said some of the cells, and are integrally formed with the outer side sealing plate.

12. The vehicle door according to claim 1, further comprising a door hinge which serves as a fulcrum when the door opens or closes the opening,
   wherein the door hinge is located at a front edge of the door main body that is constructed by the honeycomb structural body.

13. The vehicle door according to claim 1, further comprising a door lock mechanism that holds the vehicle door at the closed state,
   wherein the door lock mechanism is located in the vicinity of a part of the door main body that is constructed by the honeycomb structural body.

14. The vehicle door according to claim 1, wherein the functional part includes at least one of a door hinge and a door trim.

15. The vehicle door according to claim 1, wherein in the first door component, the honeycomb portion of the honeycomb structural body is integrally formed with the outer side sealing plate portion, and is joined to the inner side sealing plate portion, wherein in the second door component, the honeycomb portion of the honeycomb structural body is integrally formed with one of the outer side and inner side sealing plate portions, and is joined to the other sealing plate portion.

16. The vehicle door according to claim 1, wherein the first door component has a size that is equivalent to the entire door main body.

17. The vehicle door according to claim 1, wherein the second door component is formed as a rectangular frame and has an opening in a center portion.

18. A vehicle door comprising a door main body forming a main part of the vehicle door and a window glass attached to the door main body,
   wherein at least a part of the door main body is constructed by a synthetic resin honeycomb structural body, and
   wherein the honeycomb structural body includes a honeycomb portion composed of numerous tubular cells separated by partition walls, and a pair of the sealing plate portions that sandwich the honeycomb portion from both sides, thereby sealing the cells, and
   wherein a part of one of the sealing plate portions, which seal the honeycomb structural body, is formed by a part of the window glass.

19. The vehicle door according to claim 18, wherein, at a part where the window glass seals a part of the honeycomb structural body, the window glass is fixed to the honeycomb portion.

20. The vehicle door according to claim 18, wherein a part of the window glass functions as a sealing plate portion on the outer side of the honeycomb portion, and wherein a concealing portion that conceals the interior of the vehicle is provided at least on the outer side surface of the window glass that faces the honeycomb portion.

21. A vehicle door that selectively opens and closes an opening formed in the body of the vehicle, the vehicle door comprising:
   a door main body forming a main part of the vehicle door; and
   first and second door components each made of synthetic resin and each entirely formed of a honeycomb structural body and arranged adjacent to each other, the first and second door components respectively forming outer and inner side portions of the door main body,
   wherein each honeycomb structural body includes a honeycomb portion and a pair of outer side and inner side sealing plate portions located on the outer side and the inner side of the honeycomb portion, and
   wherein the honeycomb portion of the first door component is integrally formed with the outer side sealing plate portion of the first door component from the synthetic resin, and an outer surface of the outer side sealing plate portion forms an ornamental surface of the door main body.

\* \* \* \* \*